US012432753B2

(12) United States Patent
Liu et al.

(10) Patent No.: US 12,432,753 B2
(45) Date of Patent: Sep. 30, 2025

(54) CONFIGURATION OF MULTICAST RECEPTION AND MOBILITY FOR USER EQUIPMENT IN AN INACTIVE STATE

(71) Applicant: QUALCOMM Incorporated, San Diego, CA (US)

(72) Inventors: Le Liu, San Jose, CA (US); Alberto Rico Alvarino, San Diego, CA (US); Prasad Reddy Kadiri, San Diego, CA (US); Peter Gaal, San Diego, CA (US); Kazuki Takeda, Tokyo (JP); Ayan Sengupta, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 596 days.

(21) Appl. No.: 17/817,332

(22) Filed: Aug. 3, 2022

(65) Prior Publication Data

US 2024/0049255 A1     Feb. 8, 2024

(51) Int. Cl.
*H04W 72/30*     (2023.01)
(52) U.S. Cl.
CPC .................................. *H04W 72/30* (2023.01)
(58) Field of Classification Search
CPC ..... H04W 72/30; H04W 48/20; H04W 76/40; H04W 4/06; H04W 8/24; H04W 76/27
See application file for complete search history.

(56) References Cited

U.S. PATENT DOCUMENTS

| | | | | |
|---|---|---|---|---|
| 2021/0127448 A1* | 4/2021 | Kadiri | .................. | H04W 76/27 |
| 2021/0392466 A1* | 12/2021 | Liu | ....................... | H04W 24/10 |
| 2022/0353762 A1* | 11/2022 | Venkata | ............ | H04W 36/0085 |
| 2023/0269828 A1* | 8/2023 | Shrivastava | .......... | H04W 48/08 |
| | | | | 370/312 |
| 2023/0328843 A1* | 10/2023 | Babaei | .................. | H04W 76/40 |
| | | | | 370/312 |
| 2024/0023200 A1* | 1/2024 | Xiang | ................... | H04W 76/30 |
| 2024/0080939 A1* | 3/2024 | Fujishiro | ................. | H04W 8/22 |
| 2024/0205709 A1* | 6/2024 | Zheng | .............. | H04W 72/0457 |

FOREIGN PATENT DOCUMENTS

WO     WO-2024022014 A1 *     2/2024

* cited by examiner

*Primary Examiner* — Habte Mered
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may transmit capability information indicating a capability of the UE to receive multicast communications while operating in an inactive state. The UE may receive, from a first cell, configuration information that indicates a common frequency resource (CFR) associated with receiving multicast communications from the first cell while operating in the inactive state. The UE may receive, from the first cell, multicast mobility information associated with receiving multicast communications from one or more neighboring cells while operating in the inactive state. The UE may receive, while operating in the inactive state, one or more multicast communications from at least one of the first cell or a second cell based at least in part on at least one of the configuration information or the multicast mobility information. Numerous other aspects are provided.

30 Claims, 13 Drawing Sheets

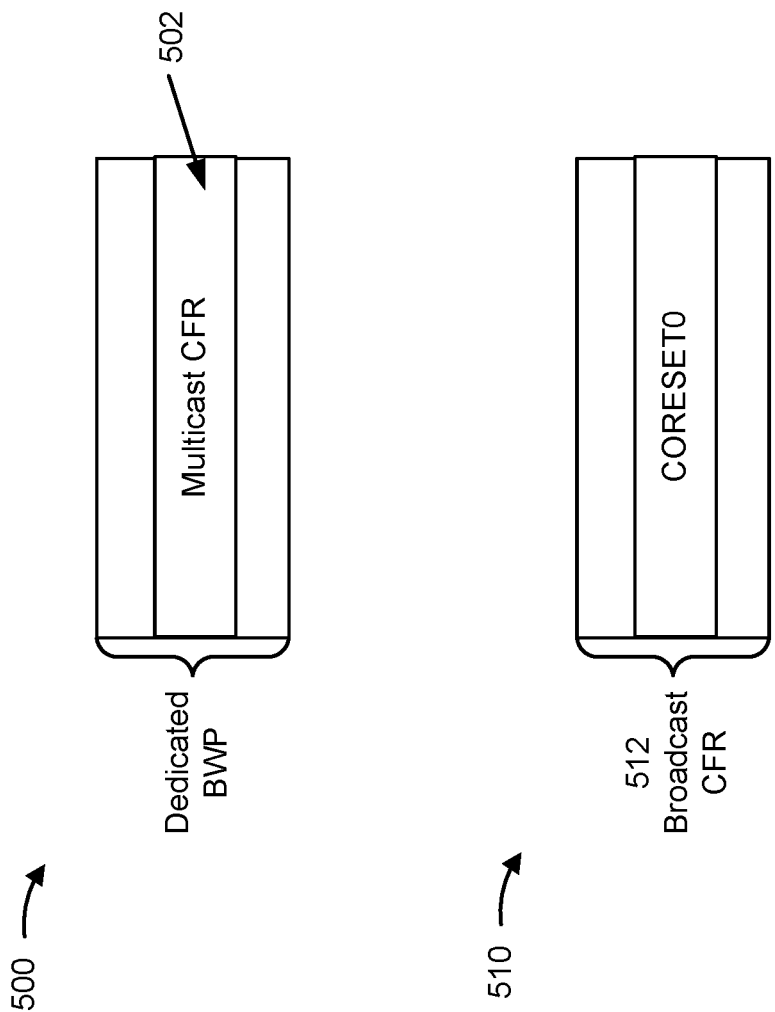

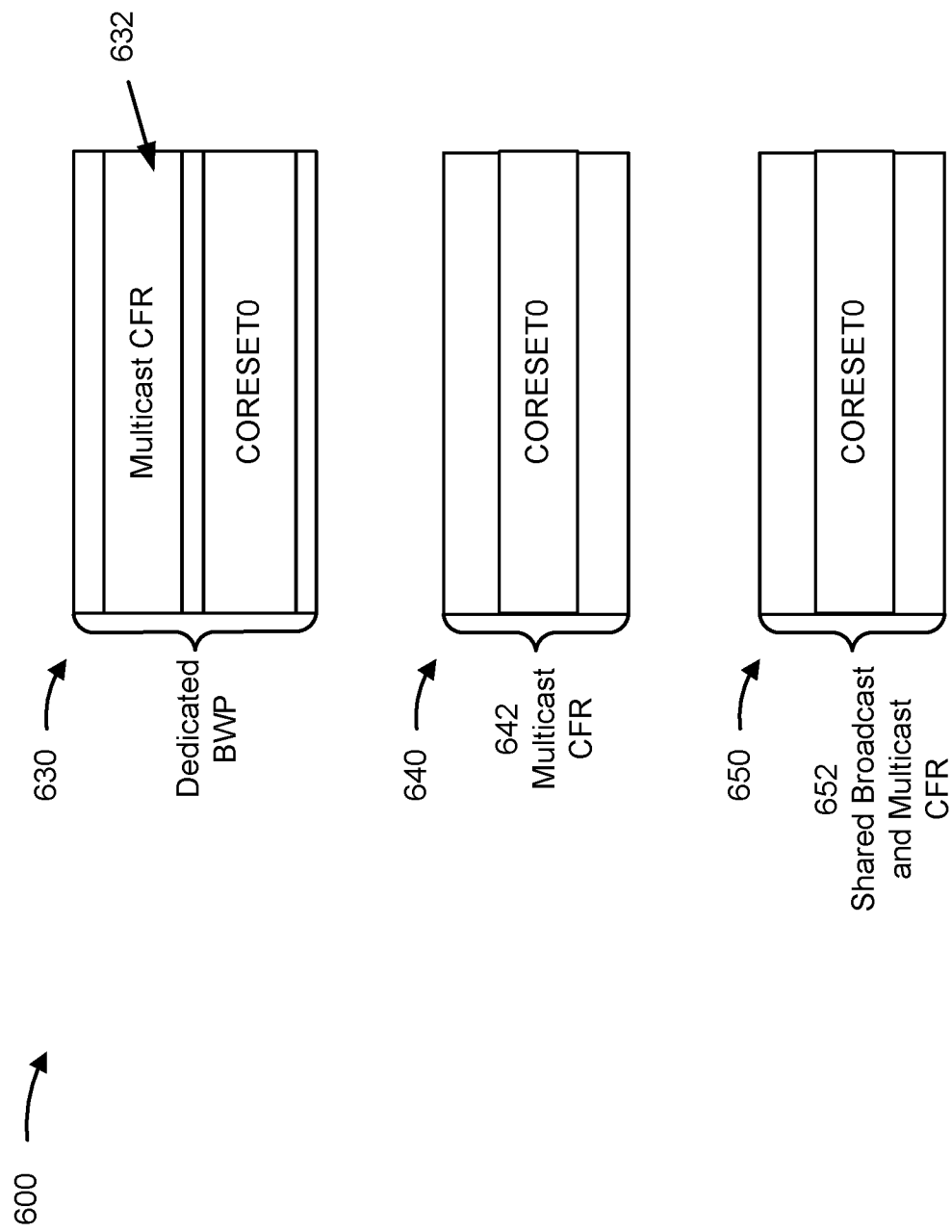

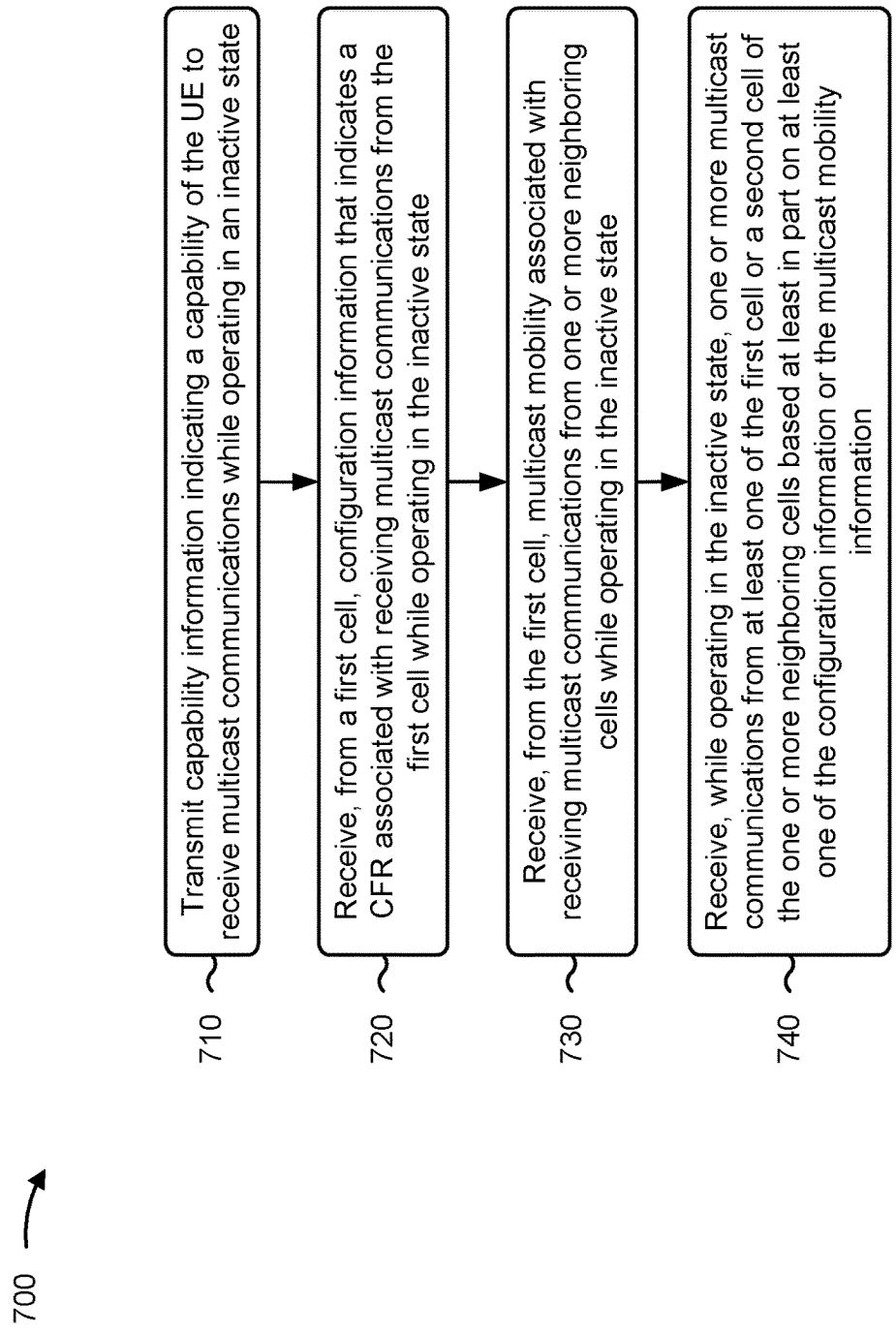

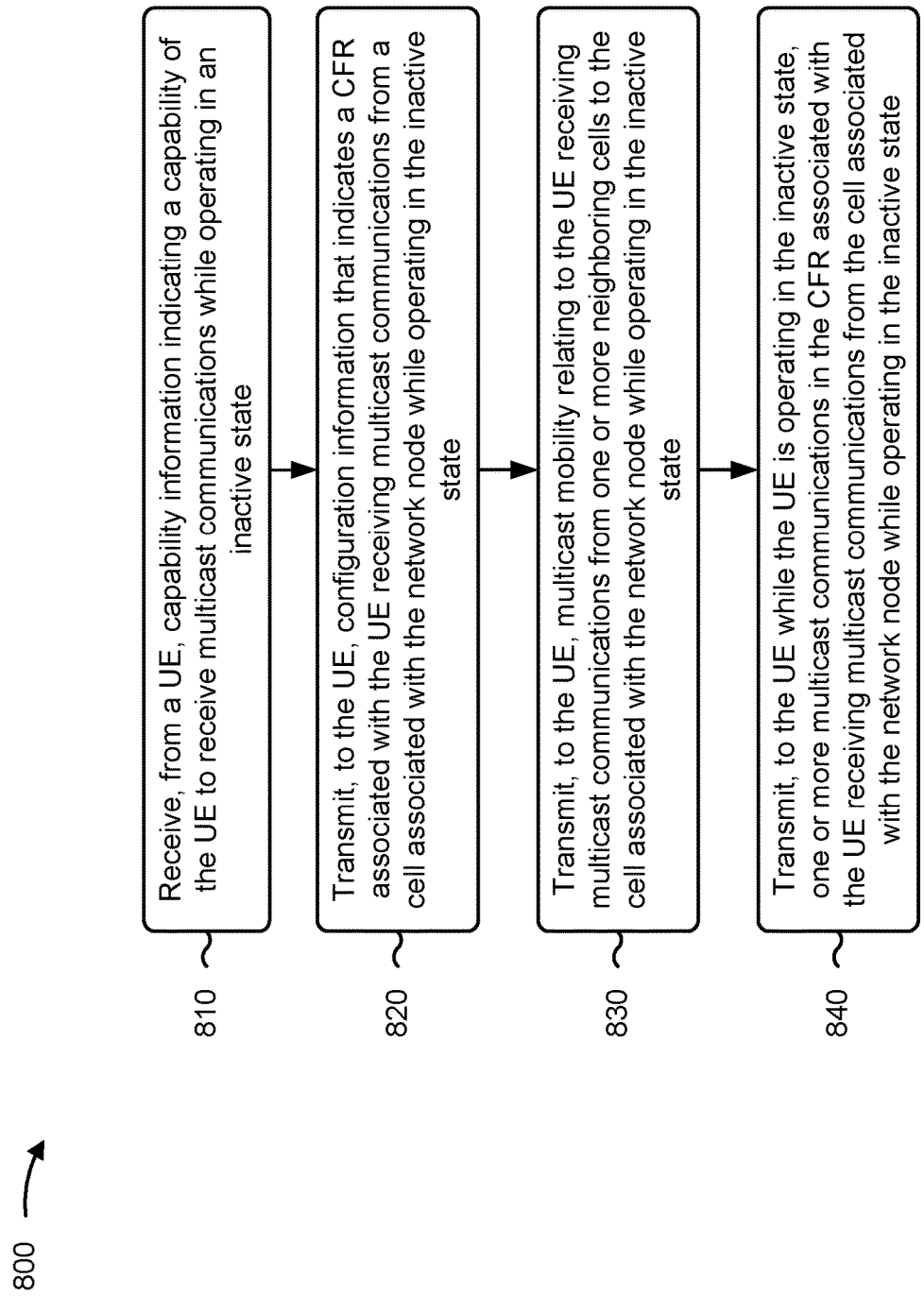

CONFIGURATION OF MULTICAST RECEPTION AND MOBILITY FOR USER EQUIPMENT IN AN INACTIVE STATE

FIELD OF THE DISCLOSURE

Aspects of the present disclosure generally relate to wireless communication and specifically, to techniques and apparatuses for configuration of multicast reception and mobility for user equipments (UEs) in an inactive state.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In some examples, multicast reception is only supported for user equipments (UEs) operating in a radio resource control (RRC) connected state. For example, in order to receive multicast service, a UE may join a multicast session via a non-access stratum (NAS) session modification (SM) procedure and receive multicast communications while operating in the RRC connected state. In such examples, a multicast configuration for the UE is indicated to the UE via RRC signaling while the UE is operating in the RRC connected state. UEs in an RRC idle state or an RRC inactive state that have joined a multicast session will transition to the RRC connected state when moving to a new cell to receive the multicast configuration for the new cell and to receive multicast communications from the new cell. In such examples, multicast reception is not supported for UEs operating in the RRC inactive state, which may limit the total quantity of UEs that the network can transition to the RRC inactive state at a given time. A UE make consume fewer network resource while operating in the RRC inactive state, as compared to the UE operating in the RRC connected state. Accordingly, the network may transition UEs to the RRC inactive state to a reduce an overall load on the network and reduce network traffic latency. However, the load reduction achieved by transitioning UEs to the RRC inactive state may be limited by the quantity of UEs that the network can transition to the RRC inactive state.

SUMMARY

Some aspects described herein relate to a user equipment (UE) for wireless communication. The UE may include at least one processor and at least one memory, communicatively coupled with the at least one processor, that stores processor-readable code. The processor-readable code, when executed by the at least one processor, may be configured to cause the user equipment to transmit capability information indicating a capability of the UE to receive multicast communications while operating in an inactive state. The processor-readable code, when executed by the at least one processor, may be configured to cause the user equipment to receive, from a first cell, configuration information that indicates a common frequency resource (CFR) associated with receiving multicast communications from the first cell while operating in the inactive state. The processor-readable code, when executed by the at least one processor, may be configured to cause the user equipment to receive, from the first cell, multicast mobility information associated with receiving multicast communications from one or more neighboring cells while operating in the inactive state. The processor-readable code, when executed by the at least one processor, may be configured to cause the user equipment to receive, while operating in the inactive state, one or more multicast communications from at least one of the first cell or a second cell of the one or more neighboring cells based at least in part on at least one of the configuration information or the multicast mobility information.

Some aspects described herein relate to a network node for wireless communication. The network node may include at least one processor and at least one memory, communicatively coupled with the at least one processor, that stores processor-readable code. The processor-readable code, when executed by the at least one processor, may be configured to cause the network node to receive, from a UE, capability information indicating a capability of the UE to receive multicast communications while operating in an inactive state. The processor-readable code, when executed by the at least one processor, may be configured to cause the network node to transmit, to the UE, configuration information that indicates a CFR associated with the UE receiving multicast communications from a cell associated with the network node while operating in the inactive state. The processor-readable code, when executed by the at least one processor, may be configured to cause the network node to transmit, to the UE, multicast mobility information relating to the UE receiving multicast communications from one or more neighboring cells to the cell associated with the network node while operating in the inactive state. The processor-readable code, when executed by the at least one processor, may be configured to cause the network node to transmit, to the UE while the UE is operating in the inactive state, one or more multicast communications in the CFR associated with the UE receiving multicast communications from the cell associated with the network node while operating in the inactive state.

Some aspects described herein relate to a method of wireless communication performed by a UE. The method may include transmitting capability information indicating a capability of the UE to receive multicast communications while operating in an inactive state. The method may include receiving, from a first cell, configuration information that indicates a CFR associated with receiving multicast communications from the first cell while operating in the inactive state. The method may include receiving, from the first cell, multicast mobility information associated with receiving multicast communications from one or more neighboring cells while operating in the inactive state. The method may include receiving, while operating in the inactive state, one or more multicast communications from at least one of the first cell or a second cell of the one or more neighboring cells based at least in part on at least one of the configuration information or the multicast mobility information.

Some aspects described herein relate to a method of wireless communication performed by a network node. The method may include receiving, from a UE, capability information indicating a capability of the UE to receive multicast communications while operating in an inactive state. The method may include transmitting, to the UE, configuration information that indicates a CFR associated with the UE receiving multicast communications from a cell associated with the network node while operating in the inactive state. The method may include transmitting, to the UE, multicast mobility information relating to the UE receiving multicast communications from one or more neighboring cells to the cell associated with the network node while operating in the inactive state. The method may include transmitting, to the UE while the UE is operating in the inactive state, one or more multicast communications in the CFR associated with the UE receiving multicast communications from the cell associated with the network node while operating in the inactive state.

Some aspects described herein relate to a non-transitory computer-readable medium that stores a set of instructions for wireless communication by a UE. The set of instructions, when executed by one or more processors of the UE, may cause the UE to transmit capability information indicating a capability of the UE to receive multicast communications while operating in an inactive state. The set of instructions, when executed by one or more processors of the UE, may cause the UE to receive, from a first cell, configuration information that indicates a CFR associated with receiving multicast communications from the first cell while operating in the inactive state. The set of instructions, when executed by one or more processors of the UE, may cause the UE to receive, from the first cell, multicast mobility information associated with receiving multicast communications from one or more neighboring cells while operating in the inactive state. The set of instructions, when executed by one or more processors of the UE, may cause the UE to receive, while operating in the inactive state, one or more multicast communications from at least one of the first cell or a second cell of the one or more neighboring cells based at least in part on at least one of the configuration information or the multicast mobility information.

Some aspects described herein relate to a non-transitory computer-readable medium that stores a set of instructions for wireless communication by a network node. The set of instructions, when executed by one or more processors of the network node, may cause the network node to receive, from a UE, capability information indicating a capability of the UE to receive multicast communications while operating in an inactive state. The set of instructions, when executed by one or more processors of the network node, may cause the network node to transmit, to the UE, configuration information that indicates a CFR associated with the UE receiving multicast communications from a cell associated with the network node while operating in the inactive state. The set of instructions, when executed by one or more processors of the network node, may cause the network node to transmit, to the UE, multicast mobility information relating to the UE receiving multicast communications from one or more neighboring cells to the cell associated with the network node while operating in the inactive state. The set of instructions, when executed by one or more processors of the network node, may cause the network node to transmit, to the UE while the UE is operating in the inactive state, one or more multicast communications in the CFR associated with the UE receiving multicast communications from the cell associated with the network node while operating in the inactive state.

Some aspects described herein relate to an apparatus for wireless communication. The apparatus may include means for transmitting capability information indicating a capability of the apparatus to receive multicast communications while operating in an inactive state. The apparatus may include means for receiving, from a first cell, configuration information that indicates a CFR associated with receiving multicast communications from the first cell while operating in the inactive state. The apparatus may include means for receiving, from the first cell, multicast mobility information associated with receiving multicast communications from one or more neighboring cells while operating in the inactive state. The apparatus may include means for receiving, while operating in the inactive state, one or more multicast communications from at least one of the first cell or a second cell of the one or more neighboring cells based at least in part on at least one of the configuration information or the multicast mobility information.

Some aspects described herein relate to an apparatus for wireless communication. The apparatus may include means for receiving, from a UE, capability information indicating a capability of the UE to receive multicast communications while operating in an inactive state. The apparatus may include means for transmitting, to the UE, configuration information that indicates a CFR associated with the UE receiving multicast communications from a cell associated with the apparatus while operating in the inactive state. The apparatus may include means for transmitting, to the UE, multicast mobility information relating to the UE receiving multicast communications from one or more neighboring cells to the cell associated with the apparatus while operating in the inactive state. The apparatus may include means for transmitting, to the UE while the UE is operating in the inactive state, one or more multicast communications in the CFR associated with the UE receiving multicast communications from the cell associated with the apparatus while operating in the inactive state.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 5 is a diagram illustrating examples of multicast and broadcast service (MBS) configurations, in accordance with the present disclosure.

FIGS. 6A-6D are diagrams illustrating an example associated with configuration of multicast reception and mobility for UEs in an inactive state, in accordance with the present disclosure.

FIG. 7 is a flowchart illustrating an example process performed, for example, by a UE that supports configuration of multicast reception and mobility for UEs in an inactive state in accordance with the present disclosure.

FIG. 8 is a flowchart illustrating an example process performed, for example, by a network node that supports configuration of multicast reception and mobility for UEs in an inactive state in accordance with the present disclosure.

DETAILED DESCRIPTION

Figure 1:
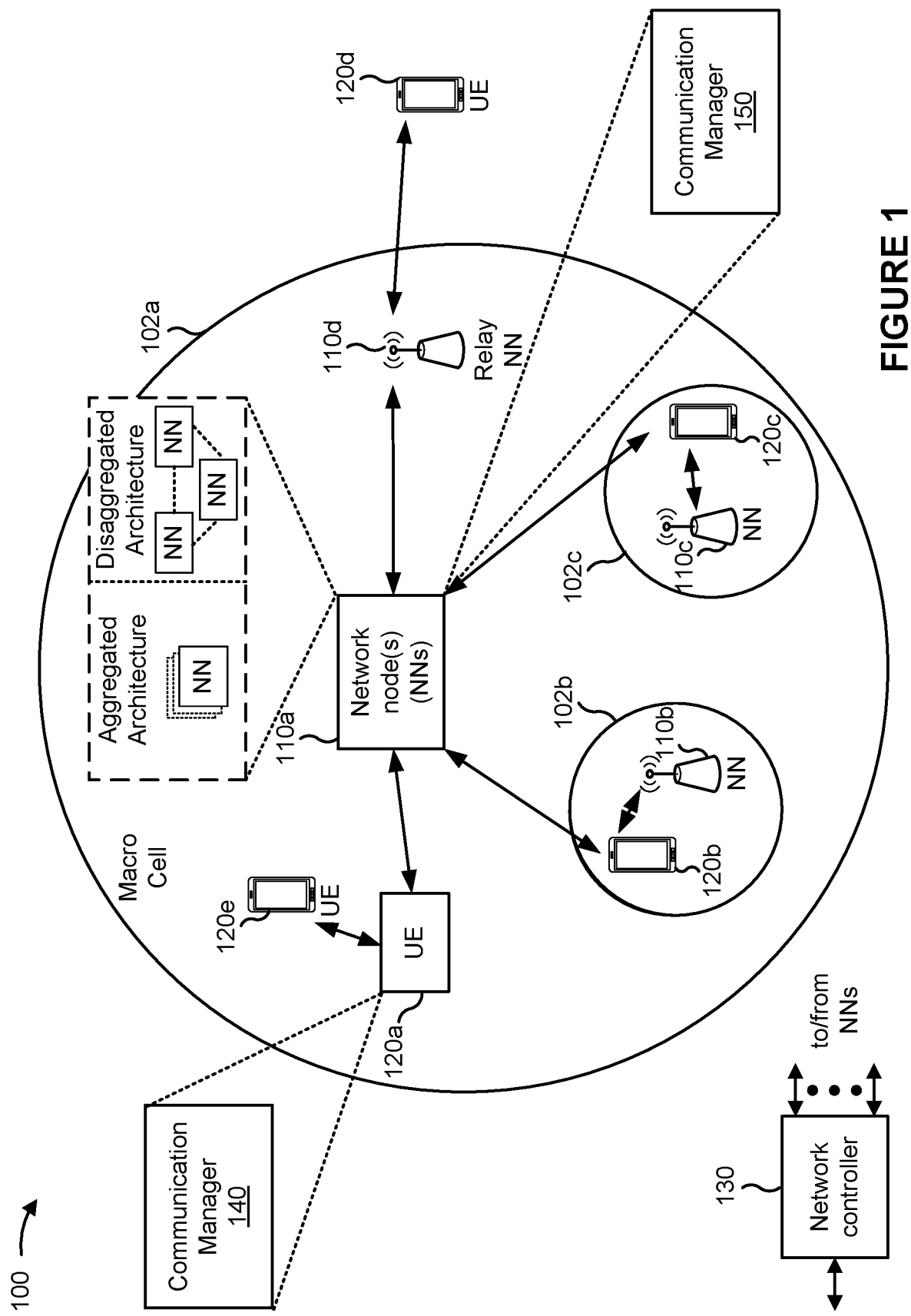
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to configuration of multicast reception and mobility for user equipments (UEs) in an inactive state. In some examples, a network entity may transmit configuration information to a UE for configuring multicast reception by the UE while operating in the inactive state. In some examples, the network entity further transmits multicast mobility information associated with multicast reception by the UE, while operating in the inactive state, when the UE switches cells. In some examples, the UE may first transmit capability information that indicates a capability of the UE to receive multicast communications while operating in the inactive state. In some such examples, the UE may then receive, from a first cell, the configuration information and the multicast mobility information. The configuration information indicates a common frequency resource (CFR) associated with receiving multicast communications from the first cell while the UE is operating in the inactive state. The multicast mobility information may include a list of neighboring cells that support multicast communications for the UE while the UE is operating in the inactive state. The multicast mobility information may also indicate which cells, in the list of neighboring cells, share a common multicast configuration with the first cell. In some examples, the UE may then receive, while operating in the inactive state, one or more multicast communications from the first cell in the CFR. In some other examples, the UE may receive, while operating in the inactive state, one or more multicast communications from a second cell, based at least in part on the multicast mobility information, in connection with switching from the first cell to the second cell.

Particular aspects of the subject matter described in this disclosure can be implemented to realize one or more of the following potential advantages. In some examples, the described techniques can be used to support reception of multicast communications by UEs operating in an inactive state by enabling UEs to receive configuration information that indicates a CFR associated with receiving multicast communications while operating in the inactive state, and by enabling UEs to receive, while operating in the inactive state, multicast communications in the CFR indicated in the configuration information. This enables the network to transition a greater quantity of UEs to the inactive state, and thus reduce the overall load on the network, resulting in decreased network traffic latency and increased network throughput. In some examples, the described techniques can be used to enable UEs operating in the inactive state, when switching to a new cell, to receive multicast communications from the new cell while operating in the inactive state without transitioning to a connected state, which may result in decreased latency for multicast reception when switching cells.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110a, a network node 110b, a network node 110c, and a network node 110d), a UE 120 or multiple UEs 120 (shown as a UE 120a, a UE 120b, a UE 120c, a UE 120d, and a UE 120e), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node"

may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term "sub-6 GHz," if used herein, may broadly represent frequencies that may be less than 6 GHz, may be within FR1, or may include mid-band frequencies.

Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may transmit capability information indicating a capability of the UE to receive multicast communications while operating in an inactive state; receive, from a first cell, configuration information that indicates a CFR associated with receiving multicast communications from the first cell while operating in the inactive state; receive, from the first cell, multicast mobility information associated with receiving multicast communications from one or more neighboring cells while operating in the inactive state; and receive, while operating in the inactive state, one or more multicast communications from at least one of the first cell or a second cell of the one or more neighboring cells based at least in part on at least one of the configuration information or the multicast mobility information. Additionally or alternatively, the communication manager 140 may perform one or more other operations described herein.

In some aspects, the network node 110 may include a communication manager 150. As described in more detail elsewhere herein, the communication manager 150 may receive, from a UE, capability information indicating a capability of the UE to receive multicast communications while operating in an inactive state; transmit, to the UE, configuration information that indicates a CFR associated with the UE receiving multicast communications from a cell associated with the network node while operating in the inactive state; transmit, to the UE, multicast mobility information relating to the UE receiving multicast communications from one or more neighboring cells to the cell associated with the network node while operating in the inactive state; and transmit, to the UE while the UE is operating in the inactive state, one or more multicast communications in the CFR associated with the UE receiving multicast communications from the cell associated with the network node while operating in the inactive state. Additionally or alternatively, the communication manager 150 may perform one or more other operations described herein.

Figure 2:
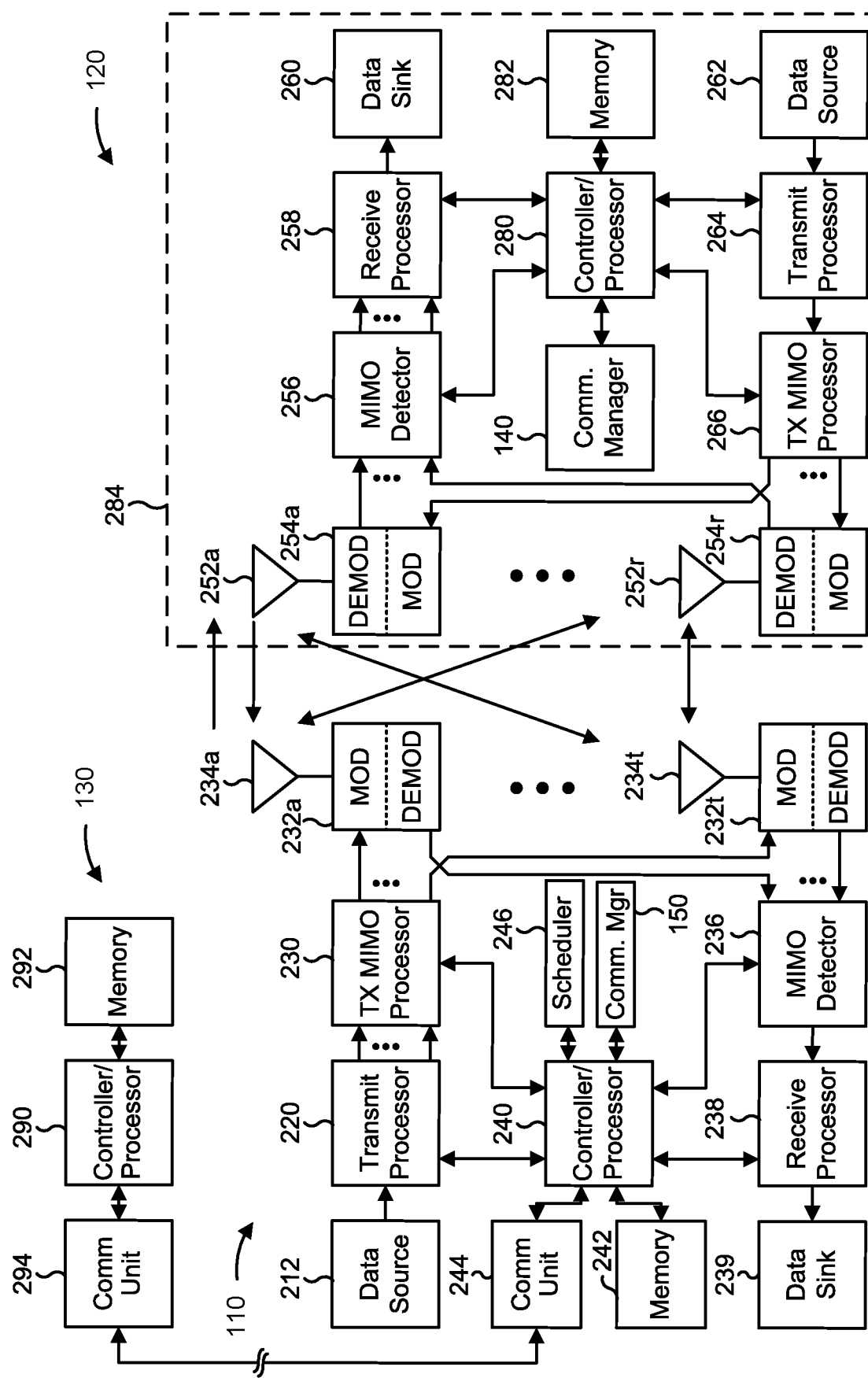
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234a through 234t, such as T antennas (T≥1). The UE 120 may be equipped with a set of antennas 252a through 252r, such as R antennas (R≥1). The network node 110 of depicted in FIG. 2 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MC S(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with configuration of multicast reception and mobility for UEs in an inactive state, as described in more detail elsewhere herein. For example, the controller/processor 240 of the network node 110, the controller/processor 280 of the UE 120, or any other component(s) of FIG. 2 may perform or direct operations of, for example, process 700 of FIG. 7, process 800 of FIG. 8, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 700 of FIG. 7, process 800 of FIG. 8, or other processes as described herein. In some examples, executing instructions may include running the instructions, converting the instructions, compiling the instructions, or interpreting the instructions, among other examples.

In some aspects, a UE (for example, the UE 120) includes means for transmitting capability information indicating a capability of the UE to receive multicast communications while operating in an inactive state; means for receiving, from a first cell, configuration information that indicates a CFR associated with receiving multicast communications from the first cell while operating in the inactive state; means for receiving, from the first cell, multicast mobility information associated with receiving multicast communications from one or more neighboring cells while operating in the inactive state; or means for receiving, while operating in the inactive state, one or more multicast communications from at least one of the first cell or a second cell of the one or more neighboring cells based at least in part on at least one of the configuration information or the multicast mobility information. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (for example, the network node 110) includes means for receiving, from a UE, capability information indicating a capability of the UE to receive multicast communications while operating in an inactive state; means for transmitting, to the UE, configuration information that indicates a CFR associated with the UE receiving multicast communications from a cell associated with the network node while operating in the inactive state; means for transmitting, to the UE, multicast mobility information relating to the UE receiving multicast communications from one or more neighboring cells to the cell associated with the network node while operating in the inactive state; or means for transmitting, to the UE while the UE is operating in the inactive state, one or more multicast communications in the CFR associated with the UE receiving multicast communications from the cell associated with the network node while operating in the inactive state. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
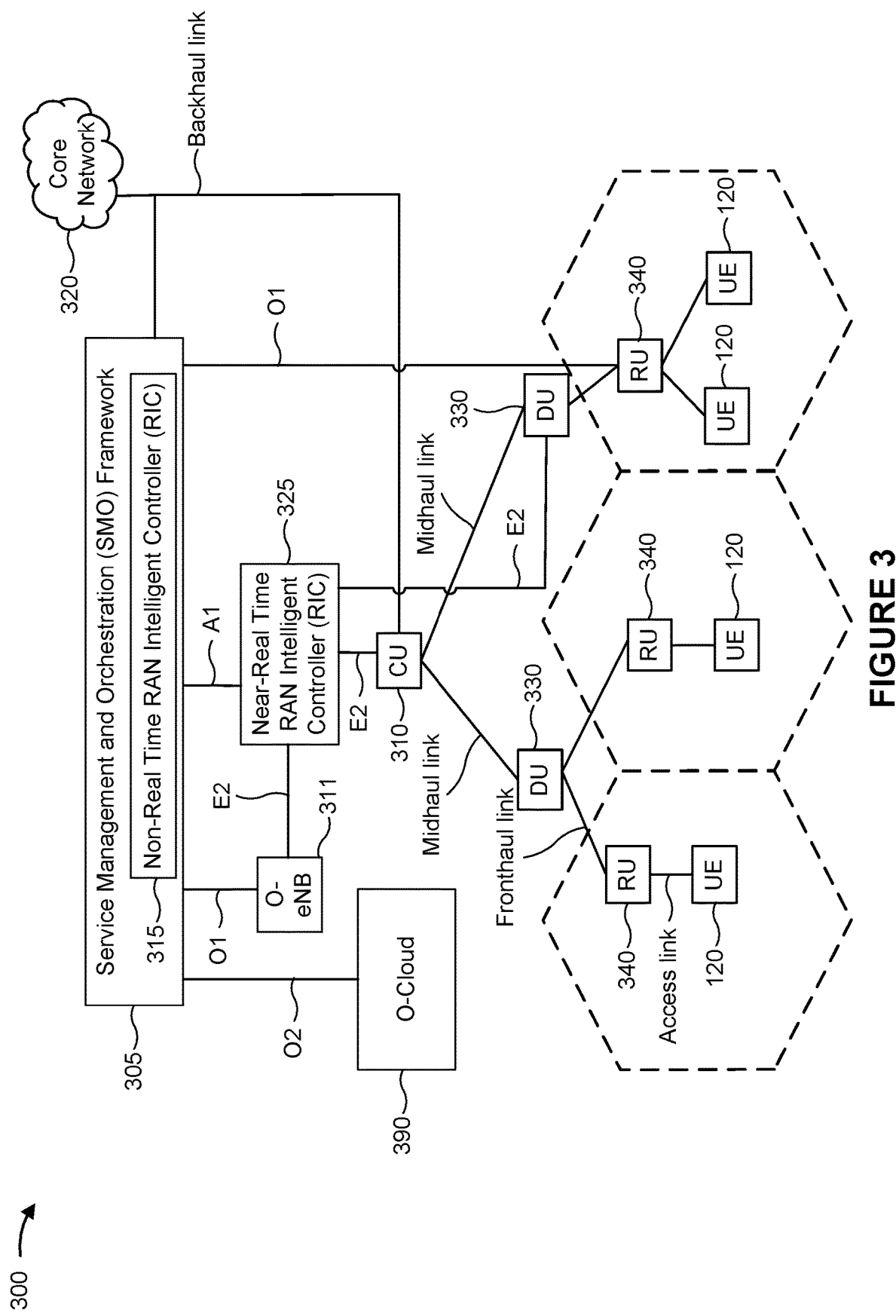
FIG. 3 is a diagram illustrating an example disaggregated base station architecture in accordance with the present disclosure.

FIG. 3 is a diagram illustrating an example disaggregated base station architecture 300 in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

Figure 4:
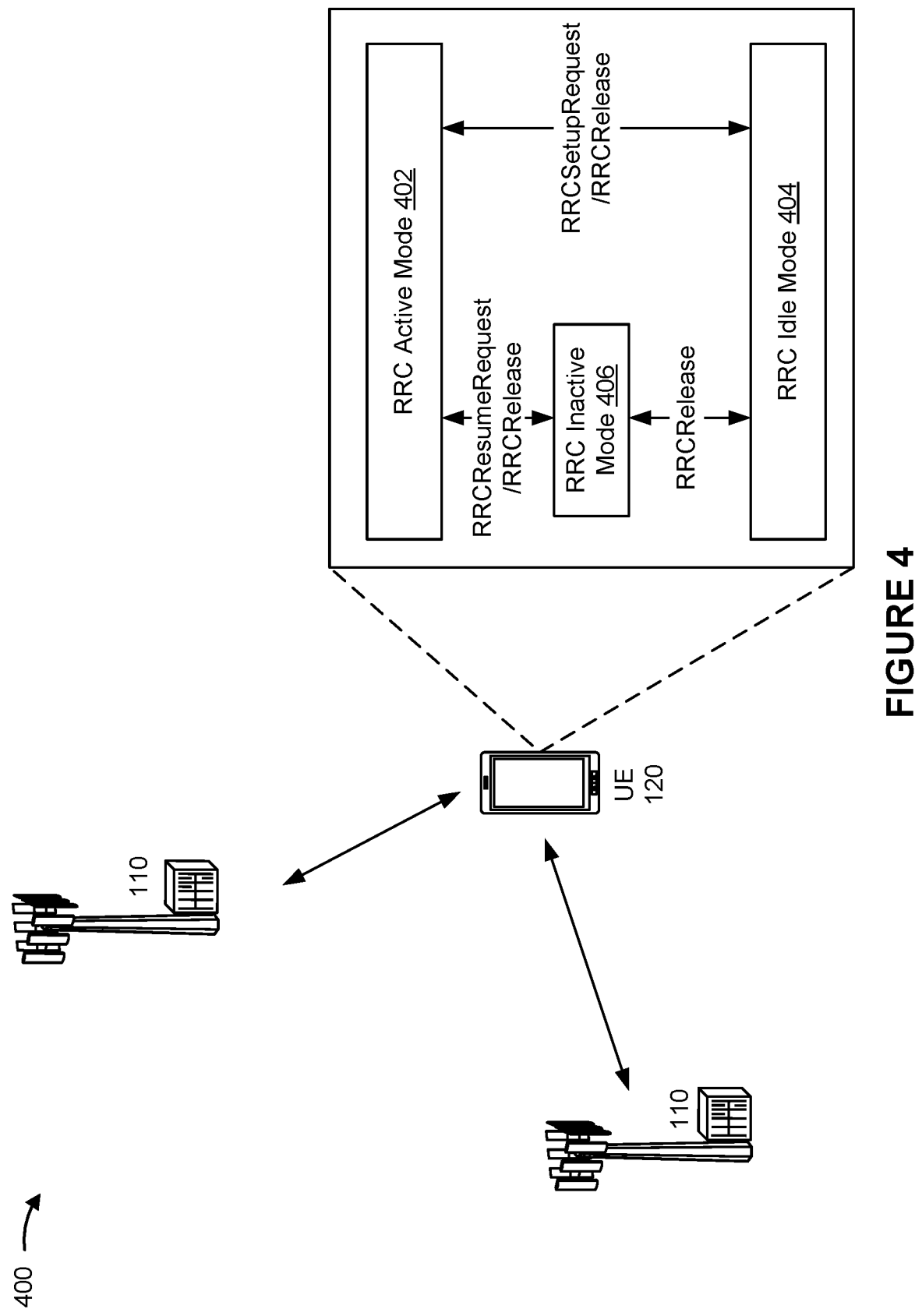
FIG. 4 illustrates an example of a wireless network in which a UE may support additional communication modes, in accordance with the present disclosure.

FIG. 4 illustrates an example 400 of a wireless network (for example, wireless network 100) in which a UE (for example, a UE 120) may support additional communication modes, in accordance with the present disclosure. The UE may be communicatively connected with one or more network nodes 110 in the wireless network. For example, the UE may be connected to the one or more network nodes 110 in a dual connectivity configuration. In this case, a first network node 110 may serve the UE as a master node and a second network node 110 may serve the UE as a secondary node.

As illustrated in FIG. 4, the UE may support a connected communication mode (for example, an RRC active mode 402 or an RRC connected mode), an idle communication mode (for example, an RRC idle mode 404), and an inactive communication mode (for example, an RRC inactive mode 406). The RRC inactive mode 406 may functionally reside between the RRC active mode 402 and the RRC idle mode 404. The UE, when operating in the connected communication mode, may be referred to as operating in a connected state (for example, an RRC connected state). The UE, when operating in the idle communication mode, may be referred to as operating in an idle state (for example, an RRC idle state). The UE, when operating in the inactive communication mode, may be referred to as operating in an inactive state (for example, an RRC inactive state).

The UE may transition between different modes based at least in part on various commands or communications received from the one or more network nodes 110. For example, the UE may transition from the RRC active mode 402 or the RRC inactive mode 406 to the RRC idle mode 404 based at least in part on receiving an RRCRelease communication. As another example, the UE may transition from the RRC active mode 402 to the RRC inactive mode 406 based at least in part on receiving an RRCRelease with suspendConfig communication. As another example, the UE may transition from the RRC idle mode 404 to the RRC active mode 402 based at least in part on receiving an RRCSetupRequest communication. As another example, the UE may transition from the RRC inactive mode 406 to the RRC active mode 402 based at least in part on receiving an RRCResumeRequest communication.

When transitioning to the RRC inactive mode 406, the UE or the one or more network nodes 110 may store a UE context (for example, an access stratum (AS) context or higher-layer configurations). This permits the UE or the one or more network nodes 110 to apply the stored UE context when the UE transitions from the RRC inactive mode 406 to the RRC active mode 402 in order to resume communications with the one or more network nodes 110, which reduces latency of transitioning to the RRC active mode 402 relative to transitioning to the RRC active mode 402 from the RRC idle mode 404.

In some cases, the UE may communicatively connect with a new master node when transitioning from the RRC idle mode 404 or the RRC inactive mode 406 to the RRC active mode 402 (for example, a master node that is different from the last serving master node when the UE transitioned to RRC idle mode 404 or RRC inactive mode 406). In this case, the new master node may be responsible for identifying a secondary node for the UE in the dual connectivity configuration.

FIG. 5 is a diagram illustrating examples 500 and 510 of multicast and broadcast service (MBS) configurations, in accordance with the present disclosure. In some examples, such as in Release 17 of the standard promulgated by the 3GPP, separate UE capabilities for multicast and broadcast are defined. Broadcast communications are point-to-multipoint (PTM) communications that may be received by all receiving devices (for example, UEs) within a range of a transmitting device (for example, a network node). Multicast communications are PTM communications that are transmitted to, and may be received by, a particular group of receiving devices (for example, UEs).

Example 500 is an example of a configuration of a multicast CFR 502, in which a UE may receive multicast communications while operating in the RRC connected state. As shown in example 500, for a UE capable of receiving multicast communications while operating in the RRC connected state, one CFR for multicast (for example, the multicast CFR 502) can be configured in a downlink dedicated bandwidth part (BWP). In such examples, the multicast CFR 502 may have the same numerology (for example, the same subcarrier spacing (SCS) and same cyclic prefix (CP)) as the downlink dedicated BWP. Reliability based at least in part on hybrid automatic repeat request (HARQ) acknowledgement (ACK) (HARQ-ACK) feedback or slot-level repetition may be supported for multicast communications transmitted to a UE in the multicast CFR 502.

Example 510 is an example of configuration of a broadcast CFR 512, in which a UE may receive broadcast communications while operating in the RRC connected state, the RRC inactive state, or the RRC idle state. As shown in example 510, for a UE capable of receiving broadcast communications while operating in the RRC connected state, the RRC inactive state, or the RRC idle state, one CFR (for example, the broadcast CFR 512) for receiving broadcast communications, such as broadcast MBS control channel (MCCH) or MBS traffic channel (MTCH) communications, may be configured via a system information block (SIB) (for example, SIB20). The broadcast CFR 512 may have the same BWP or a larger BWP as a control resource set (CORESET) type 0 (CORESET0) configured for the UE, and the broadcast CFR 512 may have the same numerology (for example, the same SCS and same CP) as the CORESET0. Reliability based at least in part on slot-level repetition may be supported for broadcast communications transmitted in the broadcast CFR 512, but HARQ-ACK feedback may not be supported for broadcast communications transmitted in the broadcast CFR 512.

In some examples (for example, in Release 17 of the standard promulgated by the 3GPP), multicast reception is only supported for UEs operating in the RRC connected state. In order for a UE to receive multicast service, the UE joins a multicast session via a non-access stratum (NAS) session modification (SM) procedure and receives multicast communications while operating in the RRC connected state. In such examples, a multicast configuration for the UE is indicated to the UE via RRC signaling while the UE is operating in the RRC connected state. UEs in the RRC idle state or the RRC inactive state that have joined a multicast session will transition to the RRC connected state when moving to a new cell to receive the multicast configuration for the new cell and to receive multicast communications from the new cell. In such examples, multicast reception is not be supported for UEs operating in the RRC inactive state, which may limit the total quantity of UEs that the network can transition to the RRC inactive state at a given time.

Various aspects relate generally to configuration of multicast reception and mobility for UEs in an inactive state. Some aspects more specifically relate to configuration information for configuring multicast reception, for a UE, while operating in the inactive state and multicast mobility information associated with multicast reception while operating in the inactive state when the UE switches cells. In some aspects, the UE may transmit capability information that indicates a capability of the UE to receive multicast communications while operating in the inactive state. The UE may receive, from a first cell, configuration information that indicates a CFR associated with receiving multicast communications from the first cell while operating in the inactive state. The UE may receive, from the first cell, multicast mobility information associated with receiving multicast communications from one or more neighboring cells while operating in the inactive state. The UE may receive, while operating in the inactive state, one or more multicast communications from the first cell in the CFR. The UE may receive, while operating in the inactive state, one or more multicast communications from a second cell based at least in part on the multicast mobility information, in connection with switching from the first cell to the second cell.

Particular aspects of the subject matter described in this disclosure can be implemented to realize one or more of the following potential advantages. In some examples, the described techniques can be used to support reception of multicast communications by UEs operating in an inactive state (for example, the RRC inactive state). This enables the network to transition a greater quantity of UEs to the inactive state, and thus reduce the overall load on the network, resulting in decreased network traffic latency and increased network speed. In some examples, the described techniques can be used to enable UEs operating in the inactive state, when switching to a new cell, to receive multicast communications from the new cell while operating in the inactive state without transitioning to a connected state, which may result in decreased latency for multicast reception when switching cells.

Figure 6A:
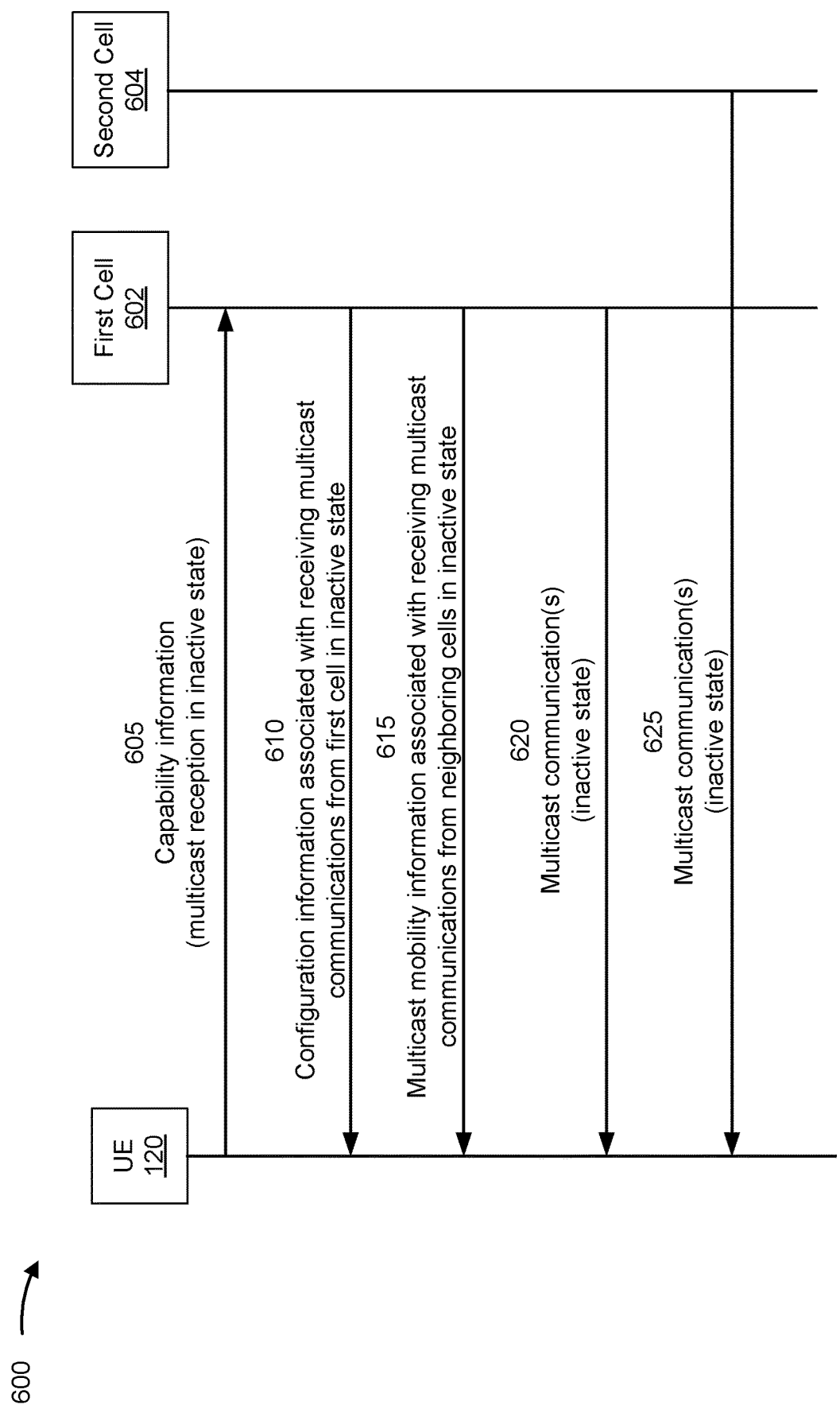
Figure 6C:
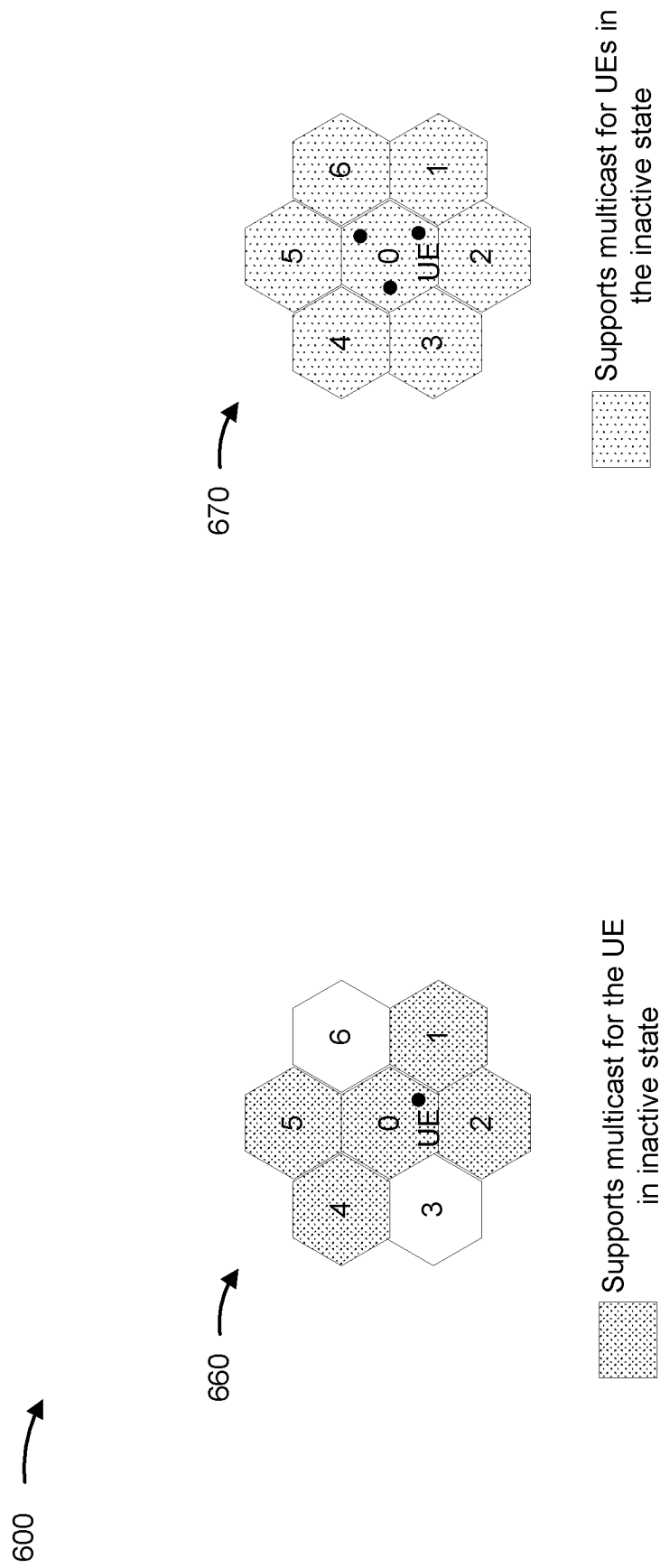
Figure 6D:
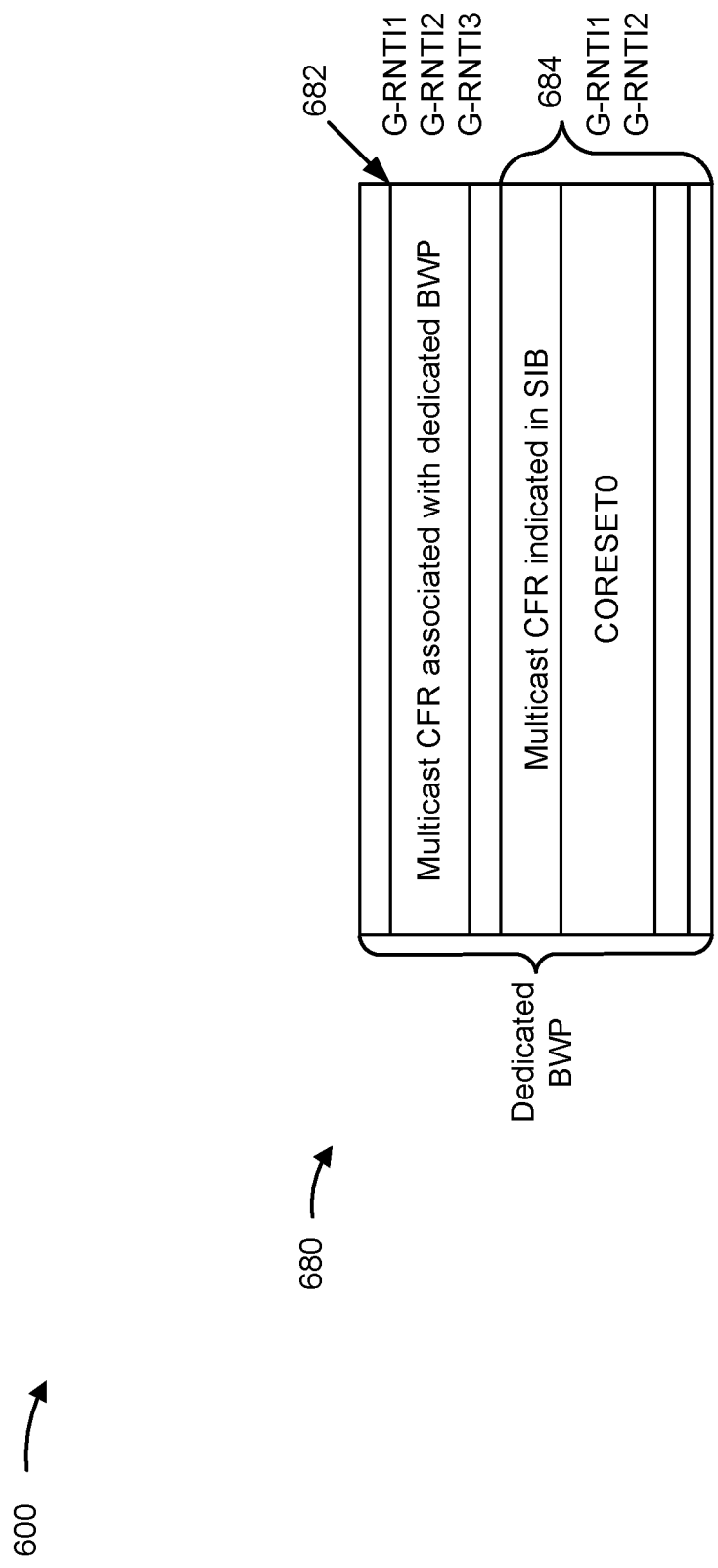

FIGS. 6A-6D are diagrams illustrating an example 600 associated with configuration of multicast reception and mobility for UEs in an inactive state, in accordance with the present disclosure. As shown in FIG. 6A, example 600 includes communication between a UE 120, a first cell 602, and a second cell 604. In some aspects, communications between the UE 120 and the first cell 602 may include communications between the UE 120 and a first network node (for example, a network node 110) associated with the first cell, and communications between the UE 120 and the second cell 604 may include communications between the UE 120 and a second network node (for example, network node 110) associated with the second cell. The UE 120 may communicate with the first cell 602 and the second cell 604 via wireless access links, which may include uplinks and downlinks.

As shown in FIG. 6A, in a first operation 605, the UE 120 may transmit, to the first cell 602, capability information. For example, the UE 120 may transmit the capability information to the first network node associated with the first cell 602, and the first network node associated with the first cell 602 may receive the capability information. In some aspects, the UE 120 may transmit the capability information to the first cell 602 while operating in a connected state (for example, an RRC connected state). The capability information may also be referred to as UE capability information.

The capability information may indicate a capability of the UE 120 to receive multicast communications while operating in an inactive state (for example, an RRC inactive state). In some aspects, the capability information may also indicate one or more capabilities of the UE 120 other than the capability of the UE 120 to receive multicast communications while operating in the inactive state. For example, the capability information may indicate a capability of the UE 120 to receive multicast communications while operating in the connected state, a capability of the UE 120 to receive broadcast communications while operating in the connected state, or a capability of the UE 120 to receive broadcast communications while operating in the inactive state, among other examples.

As further shown in FIG. 6A, in a second operation 610, the UE 120 may receive, from the first cell 602, configuration information associated with receiving multicast communications from the first cell 602 while operating in the inactive state. For example, the first network node 110-1 associated with the first cell 602 may transmit, and the UE 120 may receive, the configuration information. In some aspects, the configuration information may indicate a CFR associated with receiving multicast communications from the first cell 602 while operating in the inactive state. In some aspects, in addition to the CFR, the configuration information may indicate one or more other configuration parameters associated with a multicast configuration for receiving multicast communications from the first cell 602 while operating in the inactive state.

In some aspects, the configuration information may be included in a unicast communication. For example, the first network node associated with the first cell 602 may transmit, to the UE 120, a unicast communication including the configuration information, and the UE 120 may receive the unicast communication including the configuration information. In some aspects, the configuration information may be transmitted to the UE 120 via unicast RRC signaling. For example, the unicast communication that includes the configuration information may be a unicast RRC message. In such examples, the UE 120 may receive the unicast communication (for example, the unicast RRC message) that includes the configuration information while operating in the connected state.

In some aspects, in a first inactive state multicast configuration option (hereinafter, "Option 1"), the UE 120 may receive the configuration information in a unicast communication (for example, a unicast RRC communication), and the CFR associated with receiving multicast communications from the first cell while operating in the inactive state may be a multicast CFR configured for receiving multicast communications from the first cell 602 while operating in the connected state. For example, the UE 120 may be configured to re-use a multicast CFR configured for connected state multicast reception as the CFR for receiving multicast communications from the first cell 602 while operating in the inactive state. In such examples, the configuration information may be included in a unicast communication (for example, a unicast RRC message) that indicates a configuration of a multicast radio bearer (MRB) for connected state multicast reception and one or more multicast group radio network temporary identifiers (G-RNTIs) for the UE 120. For example, the unicast communication may be an RRC reconfiguration message that includes a RadioBearerConfig information element that indicates the MRB for the connected state multicast reception, and the MRB for the connected state multicast reception may also indicate the CFR to be used by the UE 120 for receiving multicast communications while operating in the inactive state.

As shown in example 630 in FIG. 6B, in Option 1, the CFR to be used for receiving multicast communications from the first cell 602 while operating in the inactive mode may be a multicast CFR 632 in a downlink dedicated BWP. In some cases, there may be multiple downlink dedicated BWPs with respective multicast CFRs (for connected state multicast reception) configured for the UE 120. In some aspects, the configuration information may indicate which multicast CFR, of the multiple multicast CFRs configured for the UE 120, is to be used as the CFR for receiving multicast communications from the first cell 602 while the UE 120 is operating in the inactive state. For example, the configuration information may include an indication of a BWP identifier (ID) of a dedicated BWP to indicate that the UE 120 is to use the respective multicast CFR in the dedicated BWP as the CFR for receiving multicast communications while operating in the inactive state. In some aspects, the UE 120 may apply a rule to determine which multicast CFR to use as the CFR for receiving multicast communications while operating in the inactive state. For example, the multicast CFR to be used for receiving multicast communications while operating in the inactive state may be the multicast CFR in the dedicated BWP associated with a lowest BWP ID, among the multiple dedicated BWPs with respective multicast CFRs. As further shown in example 630, the dedicated BWP may have a bandwidth greater than or equal to a bandwidth of CORESET0, CORESET0 may be fully included within the dedicated BWP, and the dedicated BWP may have a same numerology as CORESET0. In some aspects, the multicast CFR 632 may overlap with CORESET0. In some aspects, the multicast CFR 632 may not overlap with CORESET0, as shown in example 630. In some aspects, the UE 120, to receive multicast communications in the multicast CFR 632 within the downlink dedicated BWP while operating in the inactive state, may not expect to be configured with the dedicated BWP not fully overlapping with CORESET0.

In some aspects, in a second inactive state multicast configuration option (hereinafter, "Option 2"), the UE 120 may receive the configuration information in a unicast communication (for example, a unicast RRC communication), and the configuration information may indicate a configuration of a multicast CFR for receiving multicast communications while operating in the inactive state. In such examples, the configuration information may indicate a configuration for the multicast CFR for receiving multicast communications while operating in the inactive state that is separate from the configuration of one or more multicast CFRs for receiving multicast communications in the connected state. In some aspects, the configuration information indicating the inactive state multicast CFR may be included in the same unicast communication as configuration information relating to the connected state multicast CFRs. In some aspects, the configuration information indicating the inactive state multicast CFR may be included in a different unicast communication (for example, a different unicast RRC message) as configuration information relating to the connected state multicast CFRs. For example, the configuration information indicating the inactive state multicast CFR may be included in an RRC release message (RRCRelease) that triggers the UE 120 to transition from the connected state to the inactive state.

In some aspects, in Option 2, the configuration information included in the unicast communication may indicate multicast MCCH configuration. The multicast MCCH configuration may indicate a configuration for receiving an MCCH message for multicast configuration. The MCCH message for multicast configuration may be referred to as a multicast MCCH message. In some aspects, the configuration for receiving the multicast MCCH message may indicate the multicast CFR, an MCCH radio network temporary identifier (MCCH-RNTI) associated with the multicast MCCH message, a periodicity of the MCCH message, or other parameters associated with receiving the multicast MCCH message. The configuration information indicating the configuration for receiving the multicast MCCH message may be transmitted to the UE 120 via unicast RRC signaling (for example, in the RRC release message) while the UE 120 is operating in the connected state. The UE 120 may then receive the multicast MCCH message while operating in the inactive state based at least in part on the configuration for receiving the multicast MCCH message. For example, the UE 120 may receive the multicast MCCH message in the multicast CFR while operating in the inactive state. In some aspects, the UE 120 may be configured with a MCCH-RNTI to receive PDCCH/PDSCH for the multicast MCCH message via unicast RRC signaling. In some aspects, the multicast MCCH message may include additional configuration information associated with receiving multicast communications from first cell 602 while operating in the inactive state. For example, the MCCH may include multicast control information that indicates a multicast MTCH configuration. In some aspects, the MCCH message may include MBSMulticastConfiguration information elements that indicate the control information applicable for MBS multicast services transmitted via a multicast MRB, which may include multicast session information (mbs-SessionInfoList), a list of neighbor cells that support multicast communications in the inactive state (mbs-NeighborCellList), a discontinuous reception (DRX) configuration for multicast communications in the inactive state (drx_ConfigMulticast), a physical downlink shared channel (PDSCH) configuration for multicast communications in the inactive state (pdsch-ConfigMulticast), or a mapping of SSBs for multicast communications in the inactive state (multicast-SSB-MappingWindowList), among other examples.

In some aspects, the UE 120 may receive the configuration information in one or more broadcast communications from the first cell 602. For example, the first network node associated with the first cell 602 may transmit one or more broadcast communications including the configuration information, and the UE 120 may receive the one or more broadcast communications including the configuration information. In some aspects, the one or more broadcast communications that include the configuration information may include at least one of a SIB or an MCCH message broadcast from the first cell 602. In such examples, the UE 120 may receive the one or more broadcast messages (for example, the SIB or the MCCH message) while operating in the connected state or while operating in the inactive state.

In some aspects, in a third inactive state multicast configuration option (hereinafter, "Option 3"), the UE 120 may receive the configuration information in a broadcast communication (for example, a SIB or an MCCH message), and the configuration information may indicate a configuration of a multicast CFR for receiving multicast communications while operating in the inactive state. In such examples, the configuration information may indicate a configuration for the multicast CFR for receiving multicast communications while operating in the inactive state that is separate from a configuration of a broadcast CFR for receiving broadcast communications while operating in the connected state. In some aspects, in Option 3, the configuration information indicating the multicast CFR for receiving multicast communications while operating in the inactive state may be included in system information in a SIB (for example, SIB-x) broadcast from the first cell 602. For example, the SIB (SIB-x) that includes the configuration information associated with inactive state multicast reception may be different from a SIB (for example, SIB20) that includes configuration information relating to inactive state broadcast reception.

In some aspects, in Option 3, at least a portion of the configuration information associated with receiving multicast communications while operating in the inactive state may be included in an MCCH message. For example, the MCCH message may MBSMulticastConfiguration information elements that indicate the control information applicable for MBS multicast services transmitted via a multicast MRB, such as mbs-SessionInfoList, mbs-NeighborCellList, drx_ConfigMulticast, pdsch-ConfigMulticast, or multicast-SSB-MappingWindowList, among other examples. In some aspects, the configuration information associated with inactive state multicast reception may be included in a different MCCH message from configuration information associated with inactive state broadcast reception. For example, separate MCCH messages can be configured to indicate the MBSMulticastConfiguration information elements and the MBSBroadcastConfiguration information elements. In such examples, different MCCH-RNTIs may be used to differentiate the MCCH message for broadcast and multicast. For example, the multicast configuration may be included in a first MCCH message associated with a first MCCH-RNTI that is different from a second MCCH-RNTI associated with a second MCCH message that includes a broadcast configuration. In such examples, a configuration for receiving the first MCCH message including the multicast configuration may be included in a SIB (for example SIB-x). For example, the configuration for receiving the first MCCH message may indicate the multicast CFR for receiving the first MCCH message, the first MCCH-RNTI associated with the first multicast MCCH message, a periodicity of the first MCCH message, or other parameters associated with receiving the first MCCH message.

As shown in FIG. 6B, example 640 is an example of a configured multicast CFR 642 for receiving multicast communications while operating in the inactive state. For example, the multicast CFR 642 in example 640 may be configured based at least in part on configuration information included in a broadcast communication (for example, a SIB or an MCCH), as described above in connection with Option 3, or configuration information included in a unicast communication (for example, a unicast RRC message) as described above in connection with Option 2. As shown in example 640, the multicast CFR 642 may have a bandwidth greater than or equal to a bandwidth of CORESET0, CORESET0 may be fully included within the multicast CFR 642, and the multicast CFR 642 may have a same numerology as CORESET0. For example, the UE 120, to receive multicast communications in the multicast CFR 642 while operating in the inactive state, may not expect to be configured with the multicast CFR 642 that does not fully overlap with CORESET0 or that does not have the same numerology as CORESET0. In some aspects, a default bandwidth of the multicast CFR 642 (for example, if the bandwidth is not indicated in the configuration information) may be the bandwidth of CORESET0 or the bandwidth of an initial BWP configured in SIB1 for the first cell 602.

In some aspects, in a fourth inactive state multicast configuration option (hereinafter, "Option 4"), the UE 120 may receive the configuration information in a broadcast communication (for example, a SIB or an MCCH message), and the configuration information associated with inactive state multicast reception may be included in a same broadcast communication as configuration information associated with the inactive state broadcast reception. For example, the configuration information that indicates the CFR for receiving multicast communications while operating in the inactive state may be included in the same broadcast communication as configuration information that indicates a broadcast CFR for receiving broadcast communications while operating in the inactive state. In some aspects, in Option 4, the configuration information may configure a shared CFR for receiving broadcast communications and multicast communications from the first cell while operating in the inactive state. In other aspects, in Option 4, the configuration information included in the broadcast communication may indicate different CFRs for receiving multicast and broadcast communications while operating in the inactive state.

In some aspects, in Option 4, the configuration information indicating the multicast CFR for inactive state multicast reception may be included in the same SIB (for example, SIB20) that includes the configuration information relating to inactive state broadcast reception. In some aspects, in Option 4, at least a portion of the configuration information associated with receiving multicast communications while operating in the inactive state may be included in an MCCH message. For example, the MCCH message may include MBSMulticastConfiguration information elements that indicate the control information applicable for MBS multicast services transmitted via a multicast MRB, such as mbs-SessionInfoList, mbs-NeighborCellList, drx_ConfigMulticast, pdsch-ConfigMulticast, or multicast-SSB-Mapping-WindowList, among other examples. In some aspects, the configuration information associated with inactive state multicast reception may be included in the same MCCH message as the configuration information associated with inactive state broadcast reception. For example, a single MCCH message may include the MBSMulticastConfiguration information elements and MBSBroadcastConfiguration information elements. In such examples, the same MCCH-RNTI may be used for the UE 120 to detect the MCCH for both broadcast and multicast.

As shown in example 650 in FIG. 6B, in some aspects (for example, in Option 4), a shared broadcast and multicast CFR 652 may be configured for receiving broadcast communications and multicast communications while operating in the inactive state. The shared broadcast and multicast CFR 652 may have a bandwidth greater than or equal to a bandwidth of CORESET0, CORESET0 may be fully included within the shared broadcast and multicast CFR 652, and the shared broadcast and multicast CFR 652 may have a same numerology as CORESET0. For example, the UE 120, to receive multicast communications in the shared broadcast and multicast CFR 652 while operating in the inactive state, may not expect to be configured with the shared broadcast and multicast CFR 652 that does not fully overlap with CORESET0 or that does not have the same numerology as CORESET0. In some aspects, a default bandwidth of the shared broadcast and multicast CFR 652 (for example, if the bandwidth is not indicated in the configuration information) may be the bandwidth of CORESET0 or the bandwidth of an initial BWP configured in SIB1 for the first cell 602.

In some aspects, in a fifth inactive state multicast configuration option (hereinafter, "Option 5"), the UE 120 may receive the configuration information in a broadcast communication, and the CFR associated with receiving multicast communications from the first cell while operating in the inactive state is a CFR for receiving SIBs and paging messages from the first cell while operating in the inactive state. For example, the UE 120 may be configured to re-use a configuration for receiving SIBs and paging messages while operating in the inactive state as the CFR for receiving multicast communications while operating in the inactive state. In such examples, the UE 120 may use CORESET0 or an initial BWP configured in SIB1 for the first cell 602 as the CFR for receiving multicast communications while operating in the inactive state. In such examples, the broadcast communication that includes the configuration information may be a SIB (for example, SIB1) or a master information block (MIB) broadcast from the first cell 602.

Returning to FIG. 6A, in a third operation 615, the UE 120 may receive, from the first cell 602, multicast mobility information associated with receiving multicast communications from one or more neighboring cells while operating in the inactive state. The one or more neighboring cells may include neighboring cells to the first cell 602. For example, the second cell 604 may be included in the one or more neighboring cells. In some aspects, the multicast mobility information may include information that enables the UE 120 to receive multicast communications in a neighboring cell (for example, the second cell 604) while operating in the inactive state, without switching from operating in the inactive state to operating in the connected state in connection with switching from the first cell 602 to the neighbor cell (for example, the second cell 604). In some aspects, the multicast mobility information may be included in a same communication from the first cell 602 as the configuration information. In other aspects, the multicast mobility information may be included in a different communication from the first cell 602 from the configuration information.

In some aspects, the multicast mobility information may be included in a unicast communication (for example, a unicast RRC message) from the first cell 602. For example, the first network node 110-1 associated with the first cell 602 may transmit, to the UE 120, a unicast communication (for example, a unicast RRC message) that includes the multicast mobility information, and the UE 120 may receive the unicast communication that includes the multicast mobility information. In some aspects, the multicast mobility information may be included in a unicast communication in Option 1 and Option 2 described above. In such examples, the UE 120 may receive the unicast communication (for example, the unicast RRC message) that includes the multicast mobility information while operating in the connected state.

In some aspects, in a case in which the multicast mobility information is included in a unicast communication (for example, in Option 1 or Option 2), the multicast mobility information may include a list of neighboring cells that support multicast for the UE 120 while operating in the inactive state. For example, the multicast mobility information may include a list of cells (for example, Multicast-InactiveState-NeighborCellList) that indicates which neighbor cells provide multicast service(s) associated with one or more G-RNTIs or one or more temporary mobile group identities (TMGIs) for the UE 120 to receive while operating in the inactive state. As shown in example 660 in FIG. 6C, the multicast mobility information from serving cell 0 may indicate that neighboring cells 1, 2, 4, and 5 support multicast for the UE 120 while operating in the inactive state. For example, serving cell 0 may indicate, in the multicast mobility information included in a unicast communication (for example, a unicast RRC message), a cell list of {cell 1, 2, 4, 5} that indicates that neighboring cells 1, 2, 4, and 5 support multicast associated with one or more G-RNTIs for the UE 120 in the inactive state.

In some aspects (for example, in Option 1), the multicast mobility information may also indicate which cells, in the list of cells that support multicast communications for the UE 120 while the UE 120 is operating in the inactive state, share a common multicast configuration for the UE 120 with the first cell 602. In some aspects, the multicast mobility information may include a respective indication, for each cell in the list of cells that support multicast for the UE 120 while operating in the inactive state, of whether the cell shares a common multicast configuration for the UE with the first cell 602. For example, the multicast mobility information may include a bitmap of the cells in the list of cells, and a respective bit for each cell may be assigned a first value (for example, 1) that indicates that the multicast configuration for the UE 120 is the same as the first cell 602 or a second value (for example, 0) that indicates that the multicast configuration for the UE 120 is not the same as the first cell 602. For example, in example 660 in FIG. 6C, the serving cell 0 may include, in the multicast mobility information included in the unicast communication, a bitmap of {0101} that indicates that cell 2 and cell 5 share a common multicast configuration for the UE 120 with serving cell Additionally or alternatively, the multicast mobility information may include a respective indication of the multicast configuration for each cell with a multicast configuration for the UE 120 in the inactive state that is different from the multicast configuration for the first cell 602, in the list of cells that support multicast communications for the UE 120 while the UE 120 is in the inactive state. For example, the indications of the multicast configurations for the cells with different multicast configurations from the first cell 602 may be included in an RRC release message that triggers the UE 120 to transition to the inactive state.

In some aspects, in Option 2, in addition to the list of cells that support multicast communications for the UE 120 while the UE 120 is operating in the inactive state, the multicast mobility information may also indicate a respective indication of the multicast MCCH configuration for each cell with a multicast MCCH configuration for the UE 120 that is different from the multicast MCCH configuration for the UE 120 in the first cell 602, in the list of cells that support multicast communications for the UE 120 while the UE 120 is in the inactive state. For example, the indications of the multicast configurations for the cells with different multicast configurations from the first cell 602 may be included in an RRC release message that triggers the UE 120 to transition to the inactive state. In example 660 in FIG. 6C, in a case in which the MCCH multicast configurations for cell 2 and cell 5 are the same as the MCCH multicast configuration indicated to the UE 120 in the configuration information received from serving cell 0, and the MCCH multicast configurations for cell 1 and cell 4 are different from the MCCH multicast configuration indicated to the UE 120 in the configuration information received from serving cell 0, the multicast mobility information (for example, included in the RRC release message) may indicate the MCCH multicast configurations for cell 1 and cell 4.

In some aspects, the multicast mobility information may be included in a broadcast (for example, a SIB or an MCCH message) from the first cell 602. For example, the first network node 110-1 associated with the first cell 602 may transmit a broadcast communication (for example, a SIB or an MCCH message) that includes the multicast mobility information, and the UE 120 may receive the broadcast communication that includes the multicast mobility information. In some aspects, the multicast mobility information may be included in a broadcast communication in Option 3, Option 4, and Option 5 described above. In some aspects, the multicast mobility information may be included in the same broadcast communication as the configuration information. In other aspects, the multicast mobility information may be included in a different broadcast communication from the configuration information.

In some aspects, in a case in which the multicast mobility information is included in a broadcast communication (for example, in Option 3, Option 4, or Option 5), the multicast mobility information may include a list of neighboring cells that support multicast for the UEs while operating in the inactive state. For example, the multicast mobility information may include a list of cells (for example, Multicast-NeighborCellList) that indicates which neighbor cells provide multicast services for UEs in the inactive state. In such examples, the list of cells (Multicast-NeighborCellList) may be a separate list from a cell list for broadcast (MBS-NeighborCellList) included in the MCCH message for broadcast. As shown in example 670 in FIG. 6C, the multicast mobility information included in a broadcast communication (for example, a SIB) from serving cell 0 may include a cell list of {cell 1, 2, 3, 4, 5, 6} that indicates that neighboring cells 1, 2, 3, 4, 5, and 6 support multicast communications for UEs while operating in the inactive state. In some aspects, the multicast mobility information may also indicate which cells, in the list of cells that support multicast communications for UEs operating in the inactive state, provide a multicast service associated with a G-RNTI or a TMGI. The multicast mobility information may include a respective indication, for each of one or more TMGIs or G-RNTIs, of which one or more cells, in the list of cells that support multicast communications for UEs while operating in the inactive state, support multicast communications associated with the TMGI or G-RNTI. For example, a bitmap of multicast-NeighbourCell may be configured per TMGI or G-RNTI to indicate which cells in the Multicast-NeighbourCellList provide the multicast service associated with each TMGI or G-RNTI. In such examples, the bitmap of multicast-NeighbourCell bitmap may be separate from mtch-NeighbourCell for the MTCH for broadcast communications. In example 670 in FIG. 6C, the multicast mobility information included in a broadcast communication (for example, a SIB) from serving cell 0 may indicate a first bitmap of {111110} for a first G-RNTI (G-RNTI1) (indicating that cells 1-provide multicast services for G-RNTI1), a second bitmap of {110110} for a second G-RNTI (G-RNTI2) (indicating that cells 1, 2, 4, and 5 provide multicast services for G-RNTI2), and a third bitmap of {010011} for a third G-RNTI (G-RNTI3) (indicating that cells 2, 5, and 6 provide multicast services for G-RNTI3).

Returning to FIG. 6A, in a fourth operation 620, the UE 120 may receive, from the first cell 602, one or more multicast communications while operating in the inactive state. The UE 120, while operating in the connected state, may join a multicast session via an NAS SM procedure. The UE 120 may then receive, from the first cell 602, an RRC release message (with suspendConfig) that triggers the UE 120 to transition from the connected state to the inactive state. For example, the first network node associated with the first cell 602 may transmit the RRC release message to the UE 120. The UE 120, while operating in the inactive state, may receive one or more multicast communications (for example, multicast communications associated with the multicast session) from the first cell 602 based at least in part on the configuration information. In some aspects, the UE 120, while operating in the inactive state, may receive the one or more communications from the first cell 602 in the CFR associated with receiving multicast communications from the first cell 602 in the inactive state. For example, the first network node associated with the first cell 602 may transmit the one or more multicast communications to the UE 120 while the UE 120 is operating in the inactive state.

In a fifth operation 625, the UE 120 may receive, from the second cell 604, one or more multicast communications while operating in the inactive state. The UE 120 may switch from the first cell 602 to the second cell 604 while operating in the inactive state. In some aspects, in connection with switching from the first cell 602 to the second cell 604, the UE 120 may receive, while operating in the inactive state, one or more multicast communications from the second cell 604 based at least in part on the multicast mobility information received from the first cell 602. For example, the multicast communications, received by the UE 120 from the second cell 604, may be multicast communications associated with the multicast session joined by the UE 120 while operating in the connected state in the first cell 602. In some aspects, the second network node associated with the second cell 604 may transmit the one or more multicast communications to the UE 120 while the UE 120 is operating in the inactive state.

In some aspects (for example, in Option 1), the multicast mobility information may include the list of cells that support multicast communications for the UE 120 while operating in the inactive state, and the multicast mobility information may include a respective indication, for each cell in the list of cells, of whether that cell shares a common multicast configuration for the UE 120 with the first cell 602. In such examples, in a case in which the multicast mobility information indicates that the second cell 604 supports multicast communications for the UE 120 and the second cell 604 shares a common multicast configuration for the UE 120 with the first cell 602, the UE 120 may receive the multicast communications from the second cell 604 while operating in the inactive state, without switching to the connected state when switching to the second cell 604. In some aspects (for example, in Option 1), in a case in which the second cell 604 is included in the list of cells that support multicast communications for the UE 120 while operating in the inactive state, but the second cell 604 does not share a common multicast configuration for the UE 120 with the first cell 602, the multicast mobility information may include an indication of the multicast configuration for the second cell 604. In such examples, the UE 120 may receive the multicast communications from the second cell 604 while operating in the inactive state based at least in part on the indicated multicast configuration for the second cell 604 in the multicast mobility information, without switching from the inactive state to the connected state when switching to the second cell 604.

In some aspects (for example, in Option 2), the multicast mobility information may include the list of cells that support multicast communications for the UE 120 while operating in the inactive state, and the multicast mobility information may include a respective indication of the multicast MCCH configuration for each cell, in the list of cells, with a difference multicast MCCH configuration from the first cell 602. In such examples, the UE 120 may receive the multicast MCCH message from the second cell 604 either using the same multicast MCCH configuration as used in the first cell 602 (if the second cell 604 has the same multicast MCCH configuration) or using the multicast MCCH configuration indicated for the second cell 604 in the multicast mobility information. The UE 120 may then receive one or more multicast communications from the second cell 604, while operating in the inactive state (and without switching to the connected state), based at least in part on the configuration of the MTCH indicated in the MCCH message from the second cell 604.

In some aspects (for example, in Option 3, Option 4, and Option 5), the multicast mobility information may include the list of cells that support multicast communications for UEs operating in the inactive state, and the multicast mobility information may include a respective indication, for each of one or more G-RNTIs or TMGIs, of which cells, in the list of cells, support multicast communications for the G-RNTI or TMGI. In such examples, in a case in which the multicast mobility information indicates that the second cell 604 supports multicast communications for UEs operating in the inactive state and the multicast mobility information indicates that the second cell 604 supports multicast communications associated with G-RNTI or TMGI associated with the multicast session to which the UE 120 has joined, the UE 120 may receive, while operating in the inactive state, a broadcast communication including configuration information that indicates the CFR for receiving multicast communications from the second cell 604 while operating in the inactive state. The UE 120 may then receive multicast communications from the second cell 604, while operating in the inactive state, without switching to the connected state when switching to the second cell 604.

In some aspects, at least one of the configuration information received by the UE 120 in the second operation 610 or the multicast mobility information received by the UE 120 in the third operation 615 may be based at least in part on the capability information transmitted, by the UE 120, to the first cell 602 in the first operation 605. For example, the first network node associated with the first cell may select one of the configuration options described above (for example, Option 1, Option 2, Option 3, Option 4, or Option 5), or a combination of the configuration options described above, based at least in part on the capability information. In some aspects, one or more parameters for multicast reception in the inactive state may be configured for the UE 120 via a SIB (for example, as described above in Option 3 or Option 4), and one or more other parameters for multicast reception in the inactive state may be configured for the UE 120 using the multicast configurations indicated vis unicast RRC signaling (for example, as described above in Option 1) or by using a configuration for SIB and paging detection (for example, as described above in Option 5) as a default configuration.

In some aspects, a combination of Option 3 and Option 1 may be used in a case in which the capability information indicates that the UE 120 is capable of multicast reception only in the inactive state, and not broadcast reception in the inactive state. For example, the first network node associated with the first cell 602 may configure the bandwidth of the CFR for multicast reception in the inactive state in an SIB (for example, indicated in locationAndBandwidthMulticast in CFR-ConfigMulticast configured in a SIB), and other parameters, such as search space (SS)/downlink control information (DCI) formats for multicast group common physical downlink control channel (GC-PDCCH), may reuse values configured via unicast RRC signal. In some aspects, a combination of Option 4 and Option 3 may be used in a case in which the capability information indicates that the UE 120 is capable of both broadcast and multicast reception in the inactive state. For example the first network node associated with the first cell 602 may reuse the bandwidth of the broadcast CFR (for example, indicated in locationAndBandwidthBroadcast in CFR-ConfigMCCH-MTCH configured in a SIB) for the multicast CFR for multicast reception in the inactive state, and other parameters, such as for SS/DCI formats for multicast GC-PDCCH can be indicated separately from the parameters for broadcast reception. In some aspects, the bandwidth of the CFR for multicast reception in the inactive state configured in a SIB (for example, indicated in CFR-ConfigMulticast) may be different from the bandwidth of the broadcast CFR configured in a SIB (for example, indicated in CFR-ConfigMCCH-MTCH), but may be fully overlapped with the bandwidth of the broadcast CFR. For example, the CFR for multicast reception in the inactive state may be fully within the broadcast CFR.

In some aspects, the first cell 602 may transmit the configuration information or the multicast mobility information to the UE 120 using multiple options of the configuration options described above. For example, as shown in example 680 in FIG. 6D, the UE 120 may be configured with a multicast CFR 682 associated with a downlink dedicated BWP via a unicast communication (for example, a unicast RRC message), and the UE 120 may be configured with another multicast CFR 684 indicated in a SIB (for example, SIB-x). In some aspects, if both multicast CFRs 682 and 684 are confined within the dedicated BWP, the UE 120 may select to receive multicast communications, while operating in the inactive state, in the multicast CFR 682, the multicast CFR 684, or both the multicast CFR 682 and the multicast CFR 684. In some aspects, the multicast CFRs 682 and 684 may be configured for multicast communications associated with different G-RNTIs or different sets of G-RNTI. For example, as shown in example 680, the multicast CFR 682 may be configured for receiving multicast communications associated with G-RNTI1, G-RNTI2, and G-RNTI3 while the UE 120 is operating in the inactive state, and the multicast CFR 684 may be configured for receiving multicast communications associated with G-RNTI1 and G-RNTI2 while the UE 120 is operating in the inactive state.

In some aspects, the first network node associated with the first cell 602 may transmit the configuration information associated with multicast reception in the inactive state via one or more unicast communications (for example, as described in Option 1 or Option 2) and via a broadcast communication (for example, as described in Option 3, Option 4, or Option 5), and the first network node may transmit, to the UE 120 (for example, in the RRC release message that triggers the UE 120 to transition to the inactive state), an indication of which multicast configuration the UE 120 is to use for receiving multicast communications while operating in the inactive state. In such examples, the indication may indicate whether the UE 120 is to receive multicast configurations from the first cell 602, while operating in the inactive state, based at least in part on the Option 1 configuration, the Option 2 configuration, or the configuration received via the broadcast communication (for example, Option 3, Option 4, or Option 5). For example, if multicast communications associated with a G-RNTI is configured by Option 3, Option 4, or Option 5, the UE 120 may stay in the inactive state even when the UE 120 is paged by the multicast G-RNTI. Otherwise, the UE 120 may transition to the connected state to receive the multicast G-RNTI.

FIG. 7 is a flowchart illustrating an example process 700 performed, for example, by a UE that supports configuration of multicast reception and mobility for UEs in an inactive state in accordance with the present disclosure. Example process 700 is an example where the UE (for example, UE 120) performs operations associated with configuration of multicast reception and mobility for UEs in an inactive state.

As shown in FIG. 7, in some aspects, process 700 may include transmitting capability information indicating a capability of the UE to receive multicast communications while operating in an inactive state (block 710). For example, the UE (such as by using communication manager 140 or transmission component 904, depicted in FIG. 9) may transmit capability information indicating a capability of the UE to receive multicast communications while operating in an inactive state, as described above.

As further shown in FIG. 7, in some aspects, process 700 may include receiving, from a first cell, configuration information that indicates a CFR associated with receiving multicast communications from the first cell while operating in the inactive state (block 720). For example, the UE (such as by using communication manager 140 or reception component 902, depicted in FIG. 9) may receive, from a first cell, configuration information that indicates a CFR associated with receiving multicast communications from the first cell while operating in the inactive state, as described above.

As further shown in FIG. 7, in some aspects, process 700 may include receiving, from the first cell, multicast mobility information associated with receiving multicast communications from one or more neighboring cells while operating in the inactive state (block 730). For example, the UE (such as by using communication manager 140 or reception component 902, depicted in FIG. 9) may receive, from the first cell, multicast mobility information associated with receiving multicast communications from one or more neighboring cells while operating in the inactive state, as described above.

As further shown in FIG. 7, in some aspects, process 700 may include receiving, while operating in the inactive state, one or more multicast communications from at least one of the first cell or a second cell of the one or more neighboring cells based at least in part on at least one of the configuration information or the multicast mobility information (block 740). For example, the UE (such as by using communication manager 140 or reception component 902, depicted in FIG. 9) may receive, while operating in the inactive state, one or more multicast communications from at least one of the first cell or a second cell of the one or more neighboring cells based at least in part on at least one of the configuration information or the multicast mobility information, as described above.

Process 700 may include additional aspects, such as any single aspect or any combination of aspects described below or in connection with one or more other processes described elsewhere herein.

In a first additional aspect, receiving, while operating in the inactive state, the one or more multicast communications from at least one of the first cell or the second cell includes receiving, while operating in the inactive state, at least one multicast communication, of the one or more multicast communications, from the first cell in the CFR.

In a second additional aspect, alone or in combination with the first aspect, receiving, while operating in the inactive state, the one or more multicast communications from at least one of the first cell or the second cell includes receiving, while operating in the inactive state and in connection with switching from the first cell to the second cell, at least one multicast communication, of the one or more multicast communications, from the second cell based at least in part on the multicast mobility information.

In a third additional aspect, alone or in combination with one or more of the first and second aspects, the CFR associated with receiving multicast communications from the first cell while operating in the inactive state is a multicast CFR in a downlink BWP, the multicast CFR associated with receiving multicast communications from the first cell while operating in a connected state.

In a fourth additional aspect, alone or in combination with one or more of the first through third aspects, the configuration information indicates multiple multicast CFRs, in respective downlink dedicated BWPs, and the configuration indicates the multicast CFR, of the multiple multicast CFRs, to be used as the CFR associated with receiving multicast communications from the first cell while operating in the inactive state.

In a fifth additional aspect, alone or in combination with one or more of the first through fourth aspects, the configuration information indicates multiple multicast CFRs, in respective downlink dedicated BWPs, and the multicast CFR to be used as the CFR associated with receiving multicast communications from the first cell while operating in the inactive state is a multicast CFR, of the multiple multicast CFRs, in the respective downlink dedicated BWP associated with a lowest BWP identifier, among the downlink dedicated BWPs.

In a sixth additional aspect, alone or in combination with one or more of the first through fifth aspects, the downlink dedicated BWP has a bandwidth greater than or equal to a bandwidth of a CORESET0, the CORESET0 is fully included within the downlink dedicated BWP, and the downlink dedicated BWP has a same numerology as the CORESET0.

In a seventh additional aspect, alone or in combination with one or more of the first through sixth aspects, the multicast CFR overlaps with the CORESET0 within the downlink dedicated BWP.

In an eighth additional aspect, alone or in combination with one or more of the first through seventh aspects, the multicast CFR does not overlap with the CORESET0 within the downlink dedicated BWP.

In a ninth additional aspect, alone or in combination with one or more of the first through eighth aspects, receiving the configuration information and receiving the multicast mobility information includes receiving the configuration information and the multicast mobility information in a unicast communication while operating in a connected state.

In a tenth additional aspect, alone or in combination with one or more of the first through ninth aspects, the multicast mobility information includes a list of cells, of the one or more neighboring cells, that support multicast for the UE while operating in the inactive state.

In an eleventh additional aspect, alone or in combination with one or more of the first through tenth aspects, the list of cells is a list of cells, of the one or more neighboring cells, that support multicast communications associated with one or more TMGIs or one or more G-RNTIs for the UE while operating in the inactive state.

In a twelfth additional aspect, alone or in combination with one or more of the first through eleventh aspects, the multicast mobility information further includes an indication, for each cell in the list of cells that support multicast for the UE while operating in the inactive state, of whether the cell shares a common multicast configuration for the UE with the first cell.

In a thirteenth additional aspect, alone or in combination with one or more of the first through twelfth aspects, receiving, while operating in the inactive state, the one or more multicast communications from at least one of the first cell or the second cell includes receiving, while operating in the inactive state, at least one multicast communication, of the one or more multicast communications, from the second cell without switching from operating in the inactive state to operating in a connected state in connection with switching from the first cell to the second cell, based at least in part on the multicast mobility information indicating that the second cell shares the common multicast configuration for the UE with the first cell.

In a fourteenth additional aspect, alone or in combination with one or more of the first through thirteenth aspects, the multicast mobility information further includes a respective indication of a multicast configuration, of each cell, in the list of cells that support multicast for the UE while operating in the inactive state, with a different multicast configuration from the first cell.

In a fifteenth additional aspect, alone or in combination with one or more of the first through fourteenth aspects, receiving, while operating in the inactive state, the one or more multicast communications from at least one of the first cell or the second cell includes receiving, while operating in the inactive state, at least one multicast communication, of the one or more multicast communications, from the second cell without switching from operating in the inactive state to operating in a connected state in connection with switching from the first cell to the second cell, based at least in part on the multicast mobility information indicating the multicast configuration of the second cell.

In a sixteenth additional aspect, alone or in combination with one or more of the first through fifteenth aspects, receiving the configuration information includes receiving a unicast communication including the configuration information, wherein the CFR associated with receiving multicast communications from the first cell while operating in the inactive state is a multicast CFR indicated by the configuration information included in the unicast communication.

In a seventeenth additional aspect, alone or in combination with one or more of the first through sixteenth aspects, the configuration information included in the unicast communication indicates a configuration for a multicast MCCH message to be received from the first cell in the multicast CFR.

In an eighteenth additional aspect, alone or in combination with one or more of the first through seventeenth aspects, the multicast mobility information includes a list of cells, of the one or more neighboring cells, that support multicast for the UE while operating in the inactive state, and a respective indication of a multicast MCCH configuration, of each cell, in the list of cells that support multicast for the UE while operating in the inactive state, with a different multicast MCCH configuration from the first cell.

In a nineteenth additional aspect, alone or in combination with one or more of the first through eighteenth aspects, receiving, while operating in the inactive state, the one or more multicast communications from at least one of the first cell or the second cell includes receiving, while operating in the inactive state, at least one multicast communication, of the one or more multicast communications, from the second cell without switching from operating in the inactive state to operating in a connected state in connection with switching from the first cell to the second cell, based at least in part on the multicast mobility information indicating the multicast MCCH configuration of the second cell.

In a twentieth additional aspect, alone or in combination with one or more of the first through nineteenth aspects, receiving the configuration information and receiving the multicast mobility information includes receiving, from the first cell, a broadcast communication that includes the configuration information and the multicast mobility information.

In a twenty-first additional aspect, alone or in combination with one or more of the first through twentieth aspects, the broadcast communication includes a SIB or an MCCH message.

In a twenty-second additional aspect, alone or in combination with one or more of the first through twenty-first aspects, the configuration information is included in a multicast configuration indicated in the SIB or the MCCH message.

In a twenty-third additional aspect, alone or in combination with one or more of the first through twenty-second aspects, the CFR associated with receiving multicast communications from the first cell while operating in the inactive state has a bandwidth greater than or equal to a bandwidth of a CORESET0, the CORESET0 is fully included within the CFR associated with receiving multicast communications from the first cell while operating in the inactive state, and the CFR associated with receiving multicast communications from the first cell while operating in the inactive state has a same numerology as the CORESET0.

In a twenty-fourth additional aspect, alone or in combination with one or more of the first through twenty-third aspects, the multicast configuration is included in a first MCCH message associated with a first MCCH-RNTI that is different from a second MCCH-RNTI associated with a second MCCH message that includes a broadcast configuration.

In a twenty-fifth additional aspect, alone or in combination with one or more of the first through twenty-fourth aspects, the configuration information is included in a same SIB or MCCH message as broadcast configuration information relating to receiving broadcast communications in the inactive state.

In a twenty-sixth additional aspect, alone or in combination with one or more of the first through twenty-fifth aspects, the CFR associated with receiving multicast communications from the first cell while operating in the inactive state is a shared CFR for receiving broadcast communications and multicast communications from the first cell while operating in the inactive state.

In a twenty-seventh additional aspect, alone or in combination with one or more of the first through twenty-sixth aspects, the shared CFR for receiving broadcast communications and multicast communications from the first cell while operating in the inactive state has a bandwidth greater than or equal to a bandwidth of a CORESET0, the CORESET0 is fully included within the shared CFR for receiving broadcast communications and multicast communications from the first cell while operating in the inactive state, and the shared CFR for receiving broadcast communications and multicast communications from the first cell while operating in the inactive state has a same numerology as the CORESET0.

In a twenty-eighth additional aspect, alone or in combination with one or more of the first through twenty-seventh aspects, the CFR associated with receiving multicast communications from the first cell while operating in the inactive state is a CFR for receiving SIBs and paging messages from the first cell while operating in the inactive state.

In a twenty-ninth additional aspect, alone or in combination with one or more of the first through twenty-eighth aspects, the multicast mobility information includes a list of cells, of the one or more neighboring cells, that support multicast communications for UEs while operating in the inactive state.

In a thirtieth additional aspect, alone or in combination with one or more of the first through twenty-ninth aspects, the multicast mobility information further includes a respective indication, for each of one or more TMGIs or G-RNTIs, of which one or more cells, in the list of cells that support multicast communications for UEs while operating in the inactive state, support multicast communications associated with the TMGI or G-RNTI.

In a thirty-first additional aspect, alone or in combination with one or more of the first through thirtieth aspects, receiving, while operating in the inactive state, the one or more multicast communications from at least one of the first cell or the second cell includes receiving, while operating in the inactive state and in connection with switching from the first cell to the second cell, a broadcast communication from the second cell that includes second cell configuration information associated with receiving multicast communications from the second cell while operating in the inactive state, based at least in part on the multicast mobility information indicating that the second cell is included in the list of cells that supports multicast communications for UEs while operating in the inactive state, and receiving, while operating in the inactive state, at least one multicast communication, of the one or more multicast communications, from the second cell based at least in part on the second cell configuration information associated with receiving multicast communications from the second cell while operating in the inactive state.

In a thirty-second additional aspect, alone or in combination with one or more of the first through thirty-first aspects, at least one of the configuration information or the multicast mobility information is based at least in part on the capability information associated with the UE.

In a thirty-third additional aspect, alone or in combination with one or more of the first through thirty-second aspects, receiving the configuration information includes receiving, from the first cell, a unicast communication including first configuration information that indicates a first CFR, associated with a downlink dedicated BWP, for receiving multicast communications from the first cell while operating in the inactive state, and receiving, from the first cell, a broadcast communication including second configuration information that indicates a second CFR for receiving multicast communications from the first cell while operating in the inactive state, wherein the first CFR and the second CFR are included within the downlink dedicated BWP, and wherein receiving, while operating in the inactive state, the one or more multicast communications from at least one of the first cell or the second cell includes receiving, while operating in the inactive state, the one or more multicast communications from the first cell in at least one of the first CFR or the second CFR.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

FIG. 8 is a flowchart illustrating an example process 800 performed, for example, by a network node that supports configuration of multicast reception and mobility for UEs in an inactive state in accordance with the present disclosure. Example process 800 is an example where the network node (for example, network node 110) performs operations associated with configuration of multicast reception and mobility for UEs in an inactive state.

As shown in FIG. 8, in some aspects, process 800 may include receiving, from a UE, capability information indicating a capability of the UE to receive multicast communications while operating in an inactive state (block 810). For example, the network node (such as by using communication manager 150 or reception component 1002, depicted in FIG. 10) may receive, from a UE, capability information indicating a capability of the UE to receive multicast communications while operating in an inactive state, as described above.

As further shown in FIG. 8, in some aspects, process 800 may include transmitting, to the UE, configuration information that indicates a CFR associated with the UE receiving multicast communications from a cell associated with the network node while operating in the inactive state (block 820). For example, the network node (such as by using communication manager 150 or transmission component 1004, depicted in FIG. 10) may transmit, to the UE, configuration information that indicates a CFR associated with the UE receiving multicast communications from a cell associated with the network node while operating in the inactive state, as described above.

As further shown in FIG. 8, in some aspects, process 800 may include transmitting, to the UE, multicast mobility information relating to the UE receiving multicast communications from one or more neighboring cells to the cell associated with the network node while operating in the inactive state (block 830). For example, the network node (such as by using communication manager 150 or transmission component 1004, depicted in FIG. 10) may transmit, to the UE, multicast mobility information relating to the UE receiving multicast communications from one or more neighboring cells to the cell associated with the network node while operating in the inactive state, as described above.

As further shown in FIG. 8, in some aspects, process 800 may include transmitting, to the UE while the UE is operating in the inactive state, one or more multicast communications in the CFR associated with the UE receiving multicast communications from the cell associated with the network node while operating in the inactive state (block 840). For example, the network node (such as by using communication manager 150 or transmission component 1004, depicted in FIG. 10) may transmit, to the UE while the UE is operating in the inactive state, one or more multicast communications in the CFR associated with the UE receiving multicast communications from the cell associated with the network node while operating in the inactive state, as described above.

Process 800 may include additional aspects, such as any single aspect or any combination of aspects described below or in connection with one or more other processes described elsewhere herein.

In a first additional aspect, the CFR associated with the UE receiving multicast communications from the cell associated with the network node while operating in the inactive state is a multicast CFR in a downlink BWP, the multicast CFR associated with the UE receiving multicast communications from the cell associated with the network node while operating in a connected state.

In a second additional aspect, alone or in combination with the first aspect, the configuration information indicates multiple multicast CFRs, in respective downlink dedicated BWPs, and the configuration indicates the multicast CFR, of the multiple multicast CFRs, to be used as the CFR associated with the UE receiving multicast communications from the cell associated with the network node while operating in the inactive state.

In a third additional aspect, alone or in combination with one or more of the first and second aspects, the configuration information indicates multiple multicast CFRs, in respective downlink dedicated BWPs, and the multicast CFR to be used as the CFR associated with the UE receiving multicast communications from the cell associated with the network node while operating in the inactive state is a multicast CFR, of the multiple multicast CFRs, in the respective downlink dedicated BWP associated with a lowest BWP identifier, among the downlink dedicated BWPs.

In a fourth additional aspect, alone or in combination with one or more of the first through third aspects, the downlink dedicated BWP has a bandwidth greater than or equal to a bandwidth of a CORESET0, the CORESET0 is fully included within the downlink dedicated BWP, and the downlink dedicated BWP has a same numerology as the CORESET0.

In a fifth additional aspect, alone or in combination with one or more of the first through fourth aspects, the multicast CFR overlaps with the CORESET0 within the downlink dedicated BWP.

In a sixth additional aspect, alone or in combination with one or more of the first through fifth aspects, the multicast CFR does not overlap with the CORESET0 within the downlink dedicated BWP.

In a seventh additional aspect, alone or in combination with one or more of the first through sixth aspects, transmitting the configuration information and transmitting the multicast mobility information includes transmitting the configuration information and the multicast mobility information in a unicast communication while the UE is operating in a connected state.

In an eighth additional aspect, alone or in combination with one or more of the first through seventh aspects, the multicast mobility information includes a list of cells, of the one or more neighboring cells, that support multicast for the UE while the UE is operating in the inactive state.

In a ninth additional aspect, alone or in combination with one or more of the first through eighth aspects, the list of cells is a list of cells, of the one or more neighboring cells, that support multicast communications associated with one or more TMGIs or one or more G-RNTIs for the UE while the UE is operating in the inactive state.

In a tenth additional aspect, alone or in combination with one or more of the first through ninth aspects, the multicast mobility information further includes an indication, for each cell in the list of cells that support multicast for the UE while operating in the inactive state, of whether the cell shares a common multicast configuration for the UE with the first cell.

In an eleventh additional aspect, alone or in combination with one or more of the first through tenth aspects, the multicast mobility information further includes a respective indication of a multicast configuration, of each cell, in the list of cells that support multicast for the UE in the UE is operating in the inactive state, with a different multicast configuration from the first cell.

In a twelfth additional aspect, alone or in combination with one or more of the first through eleventh aspects, transmitting the configuration information includes transmitting a unicast communication including the configuration information, wherein the CFR associated with the UE receiving multicast communications from the cell associated with the network node while operating in the inactive state is a multicast CFR indicated by the configuration information included in the unicast communication.

In a thirteenth additional aspect, alone or in combination with one or more of the first through twelfth aspects, the configuration information included in the unicast communication indicates a configuration for a multicast MCCH message to be transmitted to the UE in the multicast CFR.

In a fourteenth additional aspect, alone or in combination with one or more of the first through thirteenth aspects, the multicast mobility information includes a list of cells, of the one or more neighboring cells, that support multicast for the UE while the UE is operating in the inactive state, and a respective indication of a multicast MCCH configuration, of each cell, in the list of cells that support multicast for the UE while the UE is operating in the inactive state, with a different multicast MCCH configuration from the first cell.

In a fifteenth additional aspect, alone or in combination with one or more of the first through fourteenth aspects, transmitting the configuration information and transmitting the multicast mobility information includes transmitting a broadcast communication that includes the configuration information and the multicast mobility information.

In a sixteenth additional aspect, alone or in combination with one or more of the first through fifteenth aspects, the broadcast communication includes a SIB or an MCCH message.

In a seventeenth additional aspect, alone or in combination with one or more of the first through sixteenth aspects, the configuration information is included in a multicast configuration indicated in the SIB or the MCCH message.

In an eighteenth additional aspect, alone or in combination with one or more of the first through seventeenth aspects, the CFR associated with the UE receiving multicast communications from the cell associated with the network node while operating in the inactive state has a bandwidth greater than or equal to a bandwidth of a CORESET0, the CORESET0 is fully included within the CFR associated with the UE receiving multicast communications from the cell associated with the network node while operating in the inactive state, and the CFR associated with the UE receiving multicast communications from the cell associated with the network node while operating in the inactive state has a same numerology as the CORESET0.

In a nineteenth additional aspect, alone or in combination with one or more of the first through eighteenth aspects, the multicast configuration is included in a first MCCH message associated with a first MCCH-RNTI that is different from a second MCCH-RNTI associated with a second MCCH message that includes a broadcast configuration.

In a twentieth additional aspect, alone or in combination with one or more of the first through nineteenth aspects, the configuration information is included in a same SIB or MCCH message as broadcast configuration information relating to receiving broadcast communications in the inactive state.

In a twenty-first additional aspect, alone or in combination with one or more of the first through twentieth aspects, the CFR associated with receiving multicast communications from the first cell while operating in the inactive state is a shared CFR for receiving broadcast communications and multicast communications from the first cell while operating in the inactive state.

In a twenty-second additional aspect, alone or in combination with one or more of the first through twenty-first aspects, the shared CFR for receiving broadcast communications and multicast communications from the first cell while operating in the inactive state has a bandwidth greater than or equal to a bandwidth of a CORESET0, the CORESET0 is fully included within the shared CFR for receiving broadcast communications and multicast communications from the first cell while operating in the inactive state, and the shared CFR for receiving broadcast communications and multicast communications from the first cell while operating in the inactive state has a same numerology as the CORESET0.

In a twenty-third additional aspect, alone or in combination with one or more of the first through twenty-second aspects, the CFR associated with receiving multicast communications from the first cell while operating in the inactive state is a CFR for receiving SIBs and paging messages from the first cell while operating in the inactive state.

In a twenty-fourth additional aspect, alone or in combination with one or more of the first through twenty-third aspects, the multicast mobility information includes a list of cells, of the one or more neighboring cells, that support multicast communications for UEs while operating in the inactive state.

In a twenty-fifth additional aspect, alone or in combination with one or more of the first through twenty-fourth aspects, the multicast mobility information further includes a respective indication, for each of one or more TMGIs or G-RNTIs, of which one or more cells, in the list of cells that support multicast communications for UEs while operating in the inactive state, support multicast communications associated with the TMGI or G-RNTI.

In a twenty-sixth additional aspect, alone or in combination with one or more of the first through twenty-fifth aspects, at least one of the configuration information or the multicast mobility information is based at least in part on the capability information associated with the UE.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
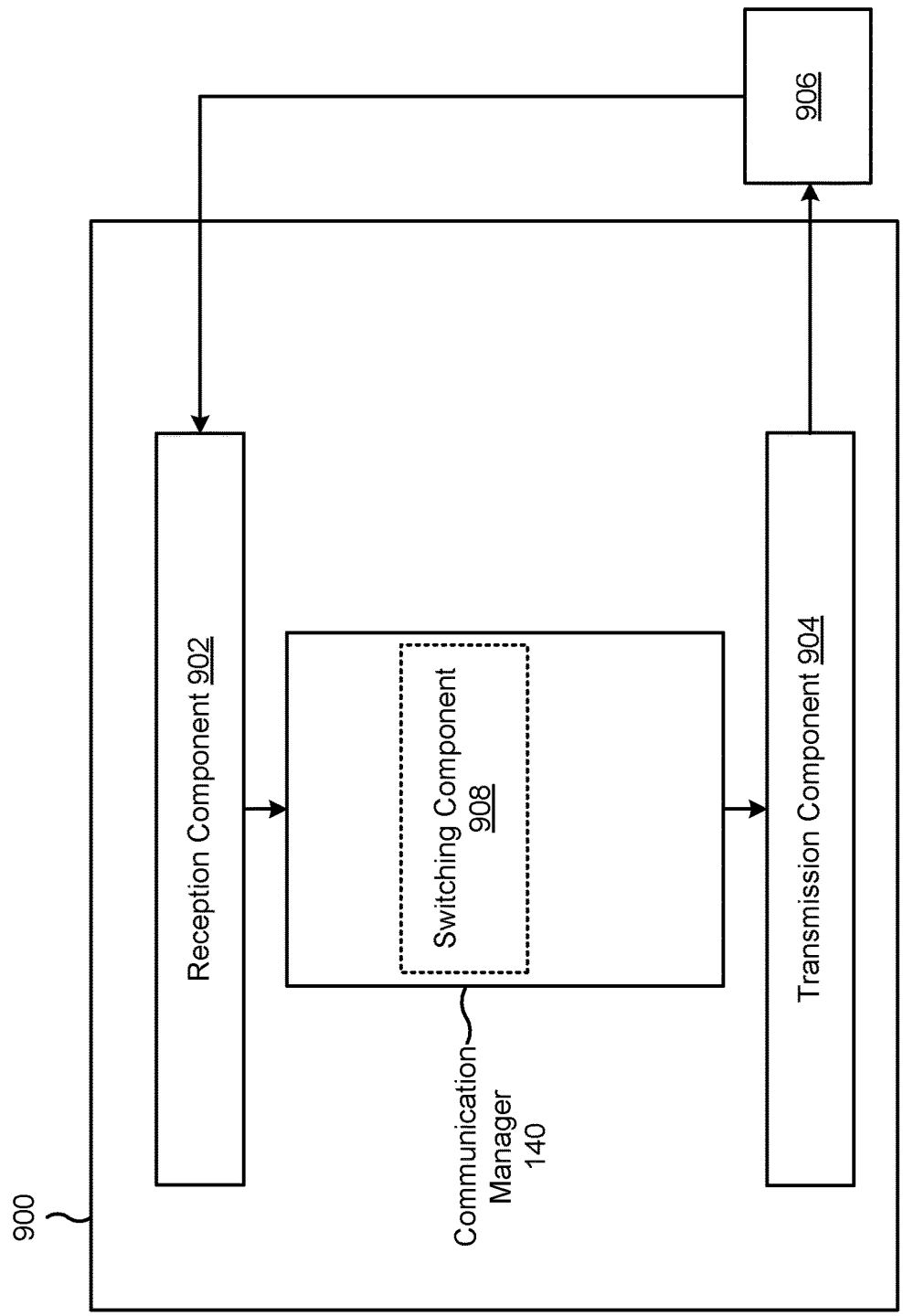
FIG. 9 is a diagram of an example apparatus for wireless communication that supports configuration of multicast reception and mobility for UEs in an inactive state in accordance with the present disclosure.

FIG. 9 is a diagram of an example apparatus 900 for wireless communication that supports configuration of multicast reception and mobility for UEs in an inactive state in accordance with the present disclosure. The apparatus 900 may be a UE, or a UE may include the apparatus 900. In some aspects, the apparatus 900 includes a reception component 902, a transmission component 904, and a communication manager 140, which may be in communication with one another (for example, via one or more buses). As shown, the apparatus 900 may communicate with another apparatus 906 (such as a UE, a network node, or another wireless communication device) using the reception component 902 and the transmission component 904.

In some aspects, the apparatus 900 may be configured to perform one or more operations described herein in connection with FIGS. 6A-6D. Additionally or alternatively, the apparatus 900 may be configured to perform one or more processes described herein, such as process 700 of FIG. 7, or a combination thereof. In some aspects, the apparatus 900 may include one or more components of the UE described above in connection with FIG. 2.

The reception component 902 may receive communications, such as reference signals, control information, data communications, or a combination thereof, from the apparatus 906. The reception component 902 may provide received communications to one or more other components of the apparatus 900, such as the communication manager 140. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a modem, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, the communication manager 140 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The communication manager 140 may transmit or may cause the transmission component 904 to transmit capability information indicating a capability of the UE to receive multicast communications while operating in an inactive state. The communication manager 140 may receive or may cause the reception component 902 to receive, from a first cell, configuration information that indicates a CFR associated with receiving multicast communications from the first cell while operating in the inactive state. The communication manager 140 may receive or may cause the reception component 902 to receive, from the first cell, multicast mobility information associated with receiving multicast communications from one or more neighboring cells while operating in the inactive state. The communication manager 140 may receive or may cause the reception component 902 to receive, while operating in the inactive state, one or more multicast communications from at least one of the first cell or a second cell of the one or more neighboring cells based at least in part on at least one of the configuration information or the multicast mobility information. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as a switching component 908. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 904 may transmit capability information indicating a capability of the UE to receive multicast communications while operating in an inactive state. The reception component 902 may receive, from a first cell, configuration information that indicates a CFR associated with receiving multicast communications from the first cell while operating in the inactive state. The reception component 902 may receive, from the first cell, multicast mobility information associated with receiving multicast communications from one or more neighboring cells while operating in the inactive state. The reception component 902 may receive, while operating in the inactive state, one or more multicast communications from at least one of the first cell or a second cell of the one or more neighboring cells based at least in part on at least one of the configuration information or the multicast mobility information.

The switching component 908 may switch from the first cell to the second cell.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
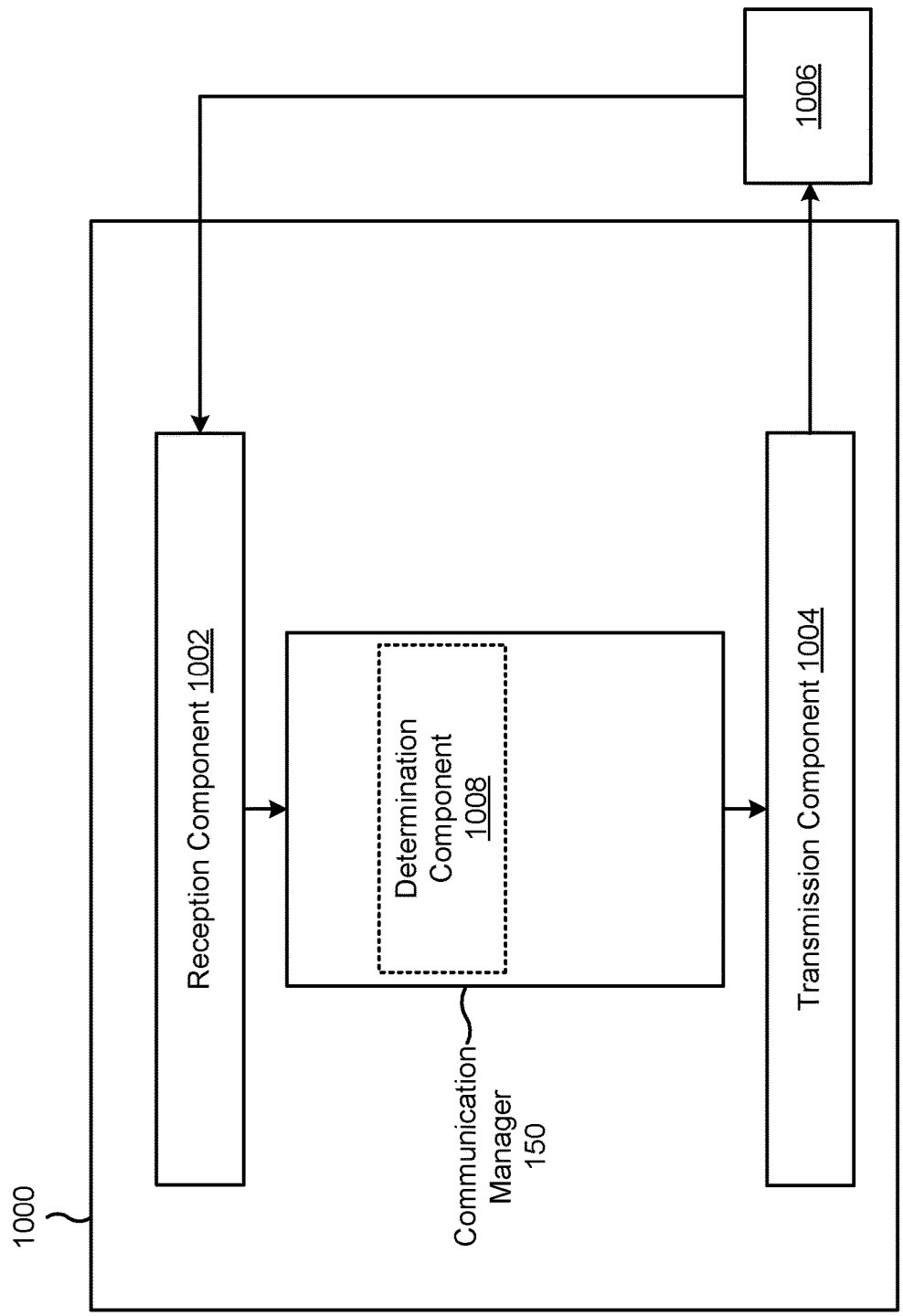
FIG. 10 is a diagram of an example apparatus for wireless communication that supports configuration of multicast reception and mobility for UEs in an inactive state in accordance with the present disclosure.

FIG. 10 is a diagram of an example apparatus 1000 for wireless communication that supports configuration of multicast reception and mobility for UEs in an inactive state in accordance with the present disclosure. The apparatus 1000 may be a network node, or a network node may include the apparatus 1000. In some aspects, the apparatus 1000 includes a reception component 1002, a transmission component 1004, and a communication manager 150, which may be in communication with one another (for example, via one or more buses). As shown, the apparatus 1000 may communicate with another apparatus 1006 (such as a UE, a network node, or another wireless communication device) using the reception component 1002 and the transmission component 1004.

In some aspects, the apparatus 1000 may be configured to perform one or more operations described herein in connection with FIGS. 6A-6D. Additionally or alternatively, the apparatus 1000 may be configured to perform one or more processes described herein, such as process 800 of FIG. 8, or a combination thereof. In some aspects, the apparatus 1000 may include one or more components of the network node described above in connection with FIG. 2.

The reception component 1002 may receive communications, such as reference signals, control information, data communications, or a combination thereof, from the apparatus 1006. The reception component 1002 may provide received communications to one or more other components of the apparatus 1000, such as the communication manager 150. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a modem, a demodulator, a MIMO detector, a receive processor, a controller/processor, a memory, or a combination thereof, of the network node described above in connection with FIG. 2.

The transmission component 1004 may transmit communications, such as reference signals, control information, data communications, or a combination thereof, to the apparatus 1006. In some aspects, the communication manager 150 may generate communications and may transmit the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described above in connection with FIG. 2. In some aspects, the transmission component 1004 may be co-located with the reception component 1002 in a transceiver.

The communication manager 150 may receive or may cause the reception component 1002 to receive, from a UE, capability information indicating a capability of the UE to receive multicast communications while operating in an inactive state. The communication manager 150 may transmit or may cause the transmission component 1004 to transmit, to the UE, configuration information that indicates a CFR associated with the UE receiving multicast communications from a cell associated with the network node while operating in the inactive state. The communication manager 150 may transmit or may cause the transmission component 1004 to transmit, to the UE, multicast mobility information relating to the UE receiving multicast communications from one or more neighboring cells to the cell associated with the network node while operating in the inactive state. The communication manager 150 may transmit or may cause the transmission component 1004 to transmit, to the UE while the UE is operating in the inactive state, one or more multicast communications in the CFR associated with the UE receiving multicast communications from the cell associated with the network node while operating in the inactive state. In some aspects, the communication manager 150 may perform one or more operations described elsewhere herein as being performed by one or more components of the communication manager 150.

The communication manager 150 may include a controller/processor, a memory, a scheduler, a communication unit, or a combination thereof, of the network node described above in connection with FIG. 2. In some aspects, the communication manager 150 includes a set of components, such as a determination component 1008. Alternatively, the set of components may be separate and distinct from the communication manager 150. In some aspects, one or more components of the set of components may include or may be implemented within a controller/processor, a memory, a scheduler, a communication unit, or a combination thereof, of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive, from a UE, capability information indicating a capability of the UE to receive multicast communications while operating in an inactive state. The transmission component 1004 may transmit, to the UE, configuration information that indicates a CFR associated with the UE receiving multicast communications from a cell associated with the network node while operating in the inactive state. The transmission component 1004 may transmit, to the UE, multicast mobility information relating to the UE receiving multicast communications from one or more neighboring cells to the cell associated with the network node while operating in the inactive state. The transmission component 1004 may transmit, to the UE while the UE is operating in the inactive state, one or more multicast communications in the CFR associated with the UE receiving multicast communications from the cell associated with the network node while operating in the inactive state.

The determination component 1008 may determine the capability information and the multicast mobility information.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: transmitting capability information indicating a capability of the UE to receive multicast communications while operating in an inactive state; receiving, from a first cell, configuration information that indicates a common frequency resource (CFR) associated with receiving multicast communications from the first cell while operating in the inactive state; receiving, from the first cell, multicast mobility information associated with receiving multicast communications from one or more neighboring cells while operating in the inactive state; and receiving, while operating in the inactive state, one or more multicast communications from at least one of the first cell or a second cell of the one or more neighboring cells based at least in part on at least one of the configuration information or the multicast mobility information.

Aspect 2: The method of Aspect 1, wherein receiving, while operating in the inactive state, the one or more multicast communications from at least one of the first cell or the second cell comprises: receiving, while operating in the inactive state, at least one multicast communication, of the one or more multicast communications, from the first cell in the CFR.

Aspect 3: The method of any of Aspects 1-2, wherein receiving, while operating in the inactive state, the one or more multicast communications from at least one of the first cell or the second cell comprises: receiving, while operating in the inactive state and in connection with switching from the first cell to the second cell, at least one multicast communication, of the one or more multicast communications, from the second cell based at least in part on the multicast mobility information.

Aspect 4: The method of any of Aspects 1-3, wherein the CFR associated with receiving multicast communications from the first cell while operating in the inactive state is a multicast CFR in a downlink dedicated bandwidth part (BWP), the multicast CFR associated with receiving multicast communications from the first cell while operating in a connected state.

Aspect 5: The method of Aspect 4, wherein the configuration information indicates multiple multicast CFRs, in respective downlink dedicated BWPs, and the configuration indicates the multicast CFR, of the multiple multicast CFRs, to be used as the CFR associated with receiving multicast communications from the first cell while operating in the inactive state.

Aspect 6: The method of any of Aspects 4-5, wherein the configuration information indicates multiple multicast CFRs, in respective downlink dedicated BWPs, and wherein the multicast CFR to be used as the CFR associated with receiving multicast communications from the first cell while operating in the inactive state is a multicast CFR, of the multiple multicast CFRs, in the respective downlink dedicated BWP associated with a lowest BWP identifier, among the downlink dedicated BWPs.

Aspect 7: The method of any of Aspects 4-6, wherein the downlink dedicated BWP has a bandwidth greater than or equal to a bandwidth of a control resource set (CORESET) type 0 (CORESET0), the CORESET0 is fully included within the downlink dedicated BWP, and the downlink dedicated BWP has a same numerology as the CORESET0.

Aspect 8: The method of Aspect 7, wherein the multicast CFR overlaps with the CORESET0 within the downlink dedicated BWP.

Aspect 9: The method of Aspect 7, wherein the multicast CFR does not overlap with the CORESET0 within the downlink dedicated BWP.

Aspect 10: The method of any of Aspects 4-9, wherein receiving the configuration information and receiving the multicast mobility information comprises: receiving the configuration information and the multicast mobility information in a unicast communication while operating in a connected state.

Aspect 11: The method of any of Aspects 4-10, wherein the multicast mobility information includes a list of cells, of the one or more neighboring cells, that support multicast for the UE while operating in the inactive state.

Aspect 12: The method of Aspect 11, wherein the list of cells is a list of cells, of the one or more neighboring cells, that support multicast communications associated with one or more temporary mobile group identities (TMGIs) or one or more group radio network temporary identifiers (G-RNTIs) for the UE while operating in the inactive state.

Aspect 13: The method of any of Aspects 11-12, wherein the multicast mobility information further includes an indication, for each cell in the list of cells that support multicast for the UE while operating in the inactive state, of whether the cell shares a common multicast configuration for the UE with the first cell.

Aspect 14: The method of Aspect 13, wherein receiving, while operating in the inactive state, the one or more multicast communications from at least one of the first cell or the second cell comprises: receiving, while operating in the inactive state, at least one multicast communication, of the one or more multicast communications, from the second cell without switching from operating in the inactive state to operating in a connected state in connection with switching from the first cell to the second cell, based at least in part on the multicast mobility information indicating that the second cell shares the common multicast configuration for the UE with the first cell.

Aspect 15: The method of any of Aspects 11-13, wherein the multicast mobility information further includes a respective indication of a multicast configuration, of each cell, in the list of cells that support multicast for the UE while operating in the inactive state, with a different multicast configuration from the first cell.

Aspect 16: The method of Aspect 15, wherein receiving, while operating in the inactive state, the one or more multicast communications from at least one of the first cell or the second cell comprises: receiving, while operating in the inactive state, at least one multicast communication, of the one or more multicast communications, from the second cell without switching from operating in the inactive state to operating in a connected state in connection with switching from the first cell to the second cell, based at least in part on the multicast mobility information indicating the multicast configuration of the second cell.

Aspect 17: The method of any of Aspects 1-16, wherein receiving the configuration information comprises: receiving a unicast communication including the configuration information, wherein the CFR associated with receiving multicast communications from the first cell while operating in the inactive state is a multicast CFR indicated by the configuration information included in the unicast communication.

Aspect 18: The method of Aspect 17, wherein the configuration information included in the unicast communication indicates a configuration for a multicast multicast broadcast service (MBS) control channel (MCCH) message to be received from the first cell in the multicast CFR.

Aspect 19: The method of any of Aspects 17-18, wherein the multicast mobility information includes: a list of cells, of the one or more neighboring cells, that support multicast for the UE while operating in the inactive state, and a respective indication of a multicast multicast broadcast service (MBS) control channel (MCCH) configuration, of each cell, in the list of cells that support multicast for the UE while operating in the inactive state, with a different multicast MCCH configuration from the first cell.

Aspect 20: The method of Aspect 19, wherein receiving, while operating in the inactive state, the one or more multicast communications from at least one of the first cell or the second cell comprises: receiving, while operating in the inactive state, at least one multicast communication, of the one or more multicast communications, from the second cell without switching from operating in the inactive state to operating in a connected state in connection with switching from the first cell to the second cell, based at least in part on the multicast mobility information indicating the multicast MCCH configuration of the second cell.

Aspect 21: The method of any of Aspects 1-20, wherein receiving the configuration information and receiving the multicast mobility information comprises: receiving, from the first cell, a broadcast communication that includes the configuration information and the multicast mobility information.

Aspect 22: The method of Aspect 21, wherein the broadcast communication includes a system information block (SIB) or a multicast and broadcast service (MBS) control channel (MCCH) message.

Aspect 23: The method of Aspect 22, wherein the configuration information is included in a multicast configuration indicated in the SIB or the MCCH message.

Aspect 24: The method of Aspect 23, wherein the CFR associated with receiving multicast communications from the first cell while operating in the inactive state has a bandwidth greater than or equal to a bandwidth of a control resource set (CORESET) type 0 (CORESET0), the CORESET0 is fully included within the CFR associated with receiving multicast communications from the first cell while operating in the inactive state, and the CFR associated with receiving multicast communications from the first cell while operating in the inactive state has a same numerology as the CORESET0.

Aspect 25: The method of any of Aspects 23-24, wherein the multicast configuration is included in a first MCCH message associated with a first MCCH radio network temporary identifier (MCCH-RNTI) that is different from a second MCCH-RNTI associated with a second MCCH message that includes a broadcast configuration.

Aspect 26: The method of any of Aspects 22-24, wherein the configuration information is included in a same SIB or MCCH message as broadcast configuration information relating to receiving broadcast communications in the inactive state.

Aspect 27: The method of Aspect 26, wherein the CFR associated with receiving multicast communications from the first cell while operating in the inactive state is a shared CFR for receiving broadcast communications and multicast communications from the first cell while operating in the inactive state.

Aspect 28: The method of Aspect 27, wherein the shared CFR for receiving broadcast communications and multicast communications from the first cell while operating in the inactive state has a bandwidth greater than or equal to a bandwidth of a control resource set (CORESET) type 0 (CORESET0), the CORESET0 is fully included within the shared CFR for receiving broadcast communications and multicast communications from the first cell while operating in the inactive state, and the shared CFR for receiving broadcast communications and multicast communications from the first cell while operating in the inactive state has a same numerology as the CORESET0.

Aspect 29: The method of any of Aspects 21-28, wherein the CFR associated with receiving multicast communications from the first cell while operating in the inactive state is a CFR for receiving system information blocks (SIBs) and paging messages from the first cell while operating in the inactive state.

Aspect 30: The method of any of Aspects 21-29, wherein the multicast mobility information includes a list of cells, of the one or more neighboring cells, that support multicast communications for UEs while operating in the inactive state.

Aspect 31: The method of Aspect 30, wherein the multicast mobility information further includes a respective indication, for each of one or more temporary mobile group identities (TMGIs) or group radio network temporary identifiers (G-RNTIs), of which one or more cells, in the list of cells that support multicast communications for UEs while operating in the inactive state, support multicast communications associated with the TMGI or G-RNTI.

Aspect 32: The method of any of Aspects 30-31, wherein receiving, while operating in the inactive state, the one or more multicast communications from at least one of the first cell or the second cell comprises: receiving, while operating in the inactive state and in connection with switching from the first cell to the second cell, a broadcast communication from the second cell that includes second cell configuration information associated with receiving multicast communications from the second cell while operating in the inactive state, based at least in part on the multicast mobility information indicating that the second cell is included in the list of cells that supports multicast communications for UEs while operating in the inactive state; and receiving, while operating in the inactive state, at least one multicast communication, of the one or more multicast communications, from the second cell based at least in part on the second cell configuration information associated with receiving multicast communications from the second cell while operating in the inactive state.

Aspect 33: The method of any of Aspects 1-32, wherein at least one of the configuration information or the multicast mobility information is based at least in part on the capability information associated with the UE.

Aspect 34: The method of any of Aspects 1-33, wherein receiving the configuration information comprises receiving, from the first cell, a unicast communication including first configuration information that indicates a first CFR, associated with a downlink dedicated bandwidth part (BWP), for receiving multicast communications from the first cell while operating in the inactive state, and receiving, from the first cell, a broadcast communication including second configuration information that indicates a second CFR for receiving multicast communications from the first cell while operating in the inactive state, wherein the first CFR and the second CFR are included within the downlink dedicated BWP, and wherein receiving, while operating in the inactive state, the one or more multicast communications from at least one of the first cell or the second cell comprises: receiving, while operating in the inactive state, the one or more multicast communications from the first cell in at least one of the first CFR or the second CFR.

Aspect 35: A method of wireless communication performed by a network node, comprising: receiving, from a user equipment (UE), capability information indicating a capability of the UE to receive multicast communications while operating in an inactive state; transmitting, to the UE, configuration information that indicates a common frequency resource (CFR) associated with the UE receiving multicast communications from a cell associated with the network node while operating in the inactive state; transmitting, to the UE, multicast mobility information relating to the UE receiving multicast communications from one or more neighboring cells to the cell associated with the network node while operating in the inactive state; and transmitting, to the UE while the UE is operating in the inactive state, one or more multicast communications in the CFR associated with the UE receiving multicast communications from the cell associated with the network node while operating in the inactive state.

Aspect 36: The method of Aspect 35, wherein the CFR associated with the UE receiving multicast communications from the cell associated with the network node while operating in the inactive state is a multicast CFR in a downlink dedicated bandwidth part (BWP), the multicast CFR associated with the UE receiving multicast communications from the cell associated with the network node while operating in a connected state.

Aspect 37: The method of Aspect 36, wherein the configuration information indicates multiple multicast CFRs, in respective downlink dedicated BWPs, and the configuration indicates the multicast CFR, of the multiple multicast CFRs, to be used as the CFR associated with the UE receiving multicast communications from the cell associated with the network node while operating in the inactive state.

Aspect 38: The method of any of Aspects 36-37, wherein the configuration information indicates multiple multicast CFRs, in respective downlink dedicated BWPs, and wherein the multicast CFR to be used as the CFR associated with the UE receiving multicast communications from the cell associated with the network node while operating in the inactive state is a multicast CFR, of the multiple multicast CFRs, in the respective downlink dedicated BWP associated with a lowest BWP identifier, among the downlink dedicated BWPs.

Aspect 39: The method of any of Aspects 36-38, wherein the downlink dedicated BWP has a bandwidth greater than or equal to a bandwidth of a control resource set (CORESET) type 0 (CORESET0), the CORESET0 is fully included within the downlink dedicated BWP, and the downlink dedicated BWP has a same numerology as the CORESET0.

Aspect 40: The method of Aspect 39, wherein the multicast CFR overlaps with the CORESET0 within the downlink dedicated BWP.

Aspect 41: The method of Aspect 39, wherein the multicast CFR does not overlap with the CORESET0 within the downlink dedicated BWP.

Aspect 42: The method of any of Aspects 36-41, wherein transmitting the configuration information and transmitting the multicast mobility information comprises: transmitting the configuration information and the multicast mobility information in a unicast communication while the UE is operating in a connected state.

Aspect 43: The method of any of Aspects 36-42, wherein the multicast mobility information includes a list of cells, of the one or more neighboring cells, that support multicast for the UE while the UE is operating in the inactive state.

Aspect 44: The method of Aspect 43, wherein the list of cells is a list of cells, of the one or more neighboring cells, that support multicast communications associated with one or more temporary mobile group identities (TMGIs) or one or more group radio network temporary identifiers (G-RNTIs) for the UE while the UE is operating in the inactive state.

Aspect 45: The method of any of Aspects 43-44, wherein the multicast mobility information further includes an indication, for each cell in the list of cells that support multicast for the UE while operating in the inactive state, of whether the cell shares a common multicast configuration for the UE with the cell associated with the network node.

Aspect 46: The method of any of Aspects 43-45, wherein the multicast mobility information further includes a respective indication of a multicast configuration, of each cell, in the list of cells that support multicast for the UE in the UE is operating in the inactive state, with a different multicast configuration from the cell associated with the network node.

Aspect 47: The method of any of Aspects 35-46, wherein transmitting the configuration information comprises: transmitting a unicast communication including the configuration information, wherein the CFR associated with the UE receiving multicast communications from the cell associated with the network node while operating in the inactive state is a multicast CFR indicated by the configuration information included in the unicast communication.

Aspect 48: The method of Aspect 47, wherein the configuration information included in the unicast communication indicates a configuration for a multicast multicast broadcast service (MBS) control channel (MCCH) message to be transmitted to the UE in the multicast CFR.

Aspect 49: The method of any of Aspects 47-48, wherein the multicast mobility information includes: a list of cells, of the one or more neighboring cells, that support multicast for the UE while the UE is operating in the inactive state, and a respective indication of a multicast multicast broadcast service (MB S) control channel (MCCH) configuration, of each cell, in the list of cells that support multicast for the UE while the UE is operating in the inactive state, with a different multicast MCCH configuration from the cell associated with the network node.

Aspect 50: The method of any of Aspects 35-49, wherein transmitting the configuration information and transmitting the multicast mobility information comprises: transmitting a broadcast communication that includes the configuration information and the multicast mobility information.

Aspect 51: The method of Aspect 50, wherein the broadcast communication includes a system information block (SIB) or a multicast and broadcast service (MBS) control channel (MCCH) message.

Aspect 52: The method of Aspect 51, wherein the configuration information is included in a multicast configuration indicated in the SIB or the MCCH message.

Aspect 53: The method of Aspect 52, wherein the CFR associated with the UE receiving multicast communications from the cell associated with the network node while operating in the inactive state has a bandwidth greater than or equal to a bandwidth of a control resource set (CORESET) type 0 (CORESET0), the CORESET0 is fully included within the CFR associated with the UE receiving multicast communications from the cell associated with the network node while operating in the inactive state, and the CFR associated with the UE receiving multicast communications from the cell associated with the network node while operating in the inactive state has a same numerology as the CORESET0.

Aspect 54: The method of any of Aspects 52-53, wherein the multicast configuration is included in a first MCCH message associated with a first MCCH radio network temporary identifier (MCCH-RNTI) that is different from a second MCCH-RNTI associated with a second MCCH message that includes a broadcast configuration.

Aspect 55: The method of any of Aspects 51-53, wherein the configuration information is included in a same SIB or MCCH message as broadcast configuration information relating to receiving broadcast communications in the inactive state.

Aspect 56: The method of Aspect 55, wherein the CFR associated with receiving multicast communications from the cell associated with the network node while operating in the inactive state is a shared CFR for receiving broadcast communications and multicast communications from the cell associated with the network node while operating in the inactive state.

Aspect 57: The method of Aspect 56, wherein the shared CFR for receiving broadcast communications and multicast communications from the cell associated with the network node while operating in the inactive state has a bandwidth greater than or equal to a bandwidth of a control resource set (CORESET) type 0 (CORESET0), the CORESET0 is fully included within the shared CFR for receiving broadcast communications and multicast communications from the cell associated with the network node while operating in the inactive state, and the shared CFR for receiving broadcast communications and multicast communications from the cell associated with the network node while operating in the inactive state has a same numerology as the CORESET0.

Aspect 58: The method of any of Aspects 50-57, wherein the CFR associated with receiving multicast communications from the cell associated with the network node while operating in the inactive state is a CFR for receiving system information blocks (SIBs) and paging messages from the cell associated with the network node while operating in the inactive state.

Aspect 59: The method of any of Aspects 50-58, wherein the multicast mobility information includes a list of cells, of the one or more neighboring cells, that support multicast communications for UEs while operating in the inactive state.

Aspect 60: The method of Aspect 59, wherein the multicast mobility information further includes a respective indication, for each of one or more temporary mobile group identities (TMGIs) or group radio network temporary identifiers (G-RNTIs), of which one or more cells, in the list of cells that support multicast communications for UEs while operating in the inactive state, support multicast communications associated with the TMGI or G-RNTI.

Aspect 61: The method of any of Aspects 35-60, wherein at least one of the configuration information or the multicast mobility information is based at least in part on the capability information associated with the UE.

Aspect 62: An apparatus for wireless communication at a device, comprising a processor; memory coupled with the processor; and instructions stored in the memory and executable by the processor to cause the apparatus to perform the method of one or more of Aspects 1-34.

Aspect 63: A device for wireless communication, comprising a memory and one or more processors coupled to the memory, the one or more processors configured to perform the method of one or more of Aspects 1-34.

Aspect 64: An apparatus for wireless communication, comprising at least one means for performing the method of one or more of Aspects 1-34.

Aspect 65: A non-transitory computer-readable medium storing code for wireless communication, the code comprising instructions executable by a processor to perform the method of one or more of Aspects 1-34.

Aspect 66: A non-transitory computer-readable medium storing a set of instructions for wireless communication, the set of instructions comprising one or more instructions that, when executed by one or more processors of a device, cause the device to perform the method of one or more of Aspects 1-34.

Aspect 67: An apparatus for wireless communication at a device, comprising a processor; memory coupled with the processor; and instructions stored in the memory and executable by the processor to cause the apparatus to perform the method of one or more of Aspects 35-61.

Aspect 68: A device for wireless communication, comprising a memory and one or more processors coupled to the memory, the one or more processors configured to perform the method of one or more of Aspects 35-61.

Aspect 69: An apparatus for wireless communication, comprising at least one means for performing the method of one or more of Aspects 35-61.

Aspect 70: A non-transitory computer-readable medium storing code for wireless communication, the code comprising instructions executable by a processor to perform the method of one or more of Aspects 35-61.

Aspect 71: A non-transitory computer-readable medium storing a set of instructions for wireless communication, the set of instructions comprising one or more instructions that, when executed by one or more processors of a device, cause the device to perform the method of one or more of Aspects 35-61.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
   at least one memory; and
   at least one processor communicatively coupled with the at least one memory, the at least one processor configured to cause the UE to:
      transmit capability information indicating a capability of the UE to receive multicast communications while operating in an inactive state;
      receive, from a first cell, configuration information that indicates a common frequency resource (CFR) associated with receiving multicast communications from the first cell while operating in the inactive state;
      receive, from the first cell, multicast mobility information associated with receiving multicast communications from one or more neighboring cells while operating in the inactive state,
         wherein the multicast mobility information includes a list of cells, of the one or more neighboring cells, that support multicast for the UE while operating in the inactive state; and
      receive, while operating in the inactive state, one or more multicast communications from a second cell of the one or more neighboring cells based at least in part on the multicast mobility information.

2. The UE of claim 1, wherein the at least one processor is further configured to cause the UE to:
   receive, while operating in the inactive state, at least one multicast communication from the first cell in the CFR based at least in part on the configuration information.

3. The UE of claim 1, wherein, to cause the UE to receive, while operating in the inactive state, the one or more multicast communications from the second cell based at least in part on the multicast mobility information, the at least one processor is configured to cause the UE to:
   receive, while operating in the inactive state and in connection with switching from the first cell to the second cell, the one or more multicast communications from the second cell based at least in part on the multicast mobility information.

4. The UE of claim 1, wherein the CFR is a multicast CFR in a downlink dedicated bandwidth part (BWP), the multicast CFR being associated with receiving multicast communications from the first cell while operating in a connected state.

5. The UE of claim 4, wherein the configuration information indicates multiple multicast CFRs, in respective downlink dedicated BWPs, and indicates the multicast CFR, of the multiple multicast CFRs, to be used as the CFR.

6. The UE of claim 1, wherein, to cause the UE to receive the configuration information and the multicast mobility information, the at least one processor is configured to cause the UE to:
   receive the configuration information and the multicast mobility information in a unicast communication while operating in a connected state.

7. The UE of claim 1, wherein the multicast mobility information further includes an indication, for each cell in the list of cells that support multicast for the UE while operating in the inactive state, of whether the cell shares a common multicast configuration for the UE with the first cell.

8. The UE of claim 7, wherein, to cause the UE to receive, while operating in the inactive state, the one or more multicast communications from the second cell, the at least one processor is configured to cause the UE to:
   receive, while operating in the inactive state, the one or more multicast communications from the second cell without switching from operating in the inactive state to operating in a connected state in connection with switching from the first cell to the second cell based at least in part on the multicast mobility information indicating that the second cell shares the common multicast configuration for the UE with the first cell.

9. The UE of claim 1, wherein the multicast mobility information further includes a respective indication of a multicast configuration, of each cell, in the list of cells that support multicast for the UE while operating in the inactive state, with a different multicast configuration from the first cell.

10. The UE of claim 9, wherein, to cause the UE to receive, while operating in the inactive state, the one or more multicast communications from the second cell, the at least one processor is configured to cause the UE to:
    receive, while operating in the inactive state, the one or more multicast communications from the second cell without switching from operating in the inactive state to operating in a connected state in connection with switching from the first cell to the second cell based at least in part on the multicast mobility information indicating the multicast configuration of the second cell.

11. The UE of claim 1, wherein, to cause the UE to receive the configuration information, the at least one processor is configured to cause the UE to:
    receive a unicast communication including the configuration information, wherein the CFR is a multicast CFR indicated by the configuration information, and wherein the configuration information indicates a configuration for a multicast multicast broadcast service (MBS) control channel (MCCH) message to be received from the first cell in the multicast CFR.

12. The UE of claim 11, wherein the multicast mobility information further includes:
    a respective indication of a multicast MCCH configuration, of each cell, in the list of cells that support multicast for the UE while operating in the inactive state, with a different multicast MCCH configuration from the first cell.

13. The UE of claim 12, wherein, to cause the UE to receive, while operating in the inactive state, the one or more multicast communications from the second cell, the at least one processor is configured to cause the UE to:
    receive, while operating in the inactive state, the one or more multicast communications from the second cell without switching from operating in the inactive state to operating in a connected state in connection with switching from the first cell to the second cell based at least in part on the multicast mobility information indicating the multicast MCCH configuration of the second cell.

14. The UE of claim 1, wherein, to cause the UE to receive the configuration information and the multicast mobility information, the at least one processor is configured to cause the UE to:

receive, from the first cell, a broadcast communication that includes the configuration information and the multicast mobility information.

15. The UE of claim 14, wherein the broadcast communication includes a system information block (SIB) or a multicast and broadcast service (MBS) control channel (MCCH) message, and wherein the configuration information is included in a multicast configuration indicated in the SIB or the MCCH message.

16. The UE of claim 15, wherein the multicast configuration is included in a first MCCH message associated with a first MCCH radio network temporary identifier (MCCH-RNTI) that is different from a second MCCH-RNTI associated with a second MCCH message that includes a broadcast configuration.

17. The UE of claim 15, wherein the configuration information is included in a same SIB or MCCH message as broadcast configuration information relating to receiving broadcast communications in the inactive state.

18. The UE of claim 17, wherein the CFR is a shared CFR for receiving broadcast communications and multicast communications from the first cell while operating in the inactive state.

19. The UE of claim 14, wherein the CFR is a CFR for receiving system information blocks (SIBs) and paging messages from the first cell while operating in the inactive state.

20. The UE of claim 14, wherein the multicast mobility information further includes a respective indication, for each of one or more temporary mobile group identities (TMGIs) or group radio network temporary identifiers (G-RNTIs), of which one or more cells, in the list of cells that support multicast communications for UEs while operating in the inactive state, support multicast communications associated with the TMGI or G-RNTI.

21. The UE of claim 1, wherein, to cause the UE to receive, while operating in the inactive state, the one or more multicast communications from the second cell, the at least one processor is configured to cause the UE to:
receive, while operating in the inactive state and in connection with switching from the first cell to the second cell, a broadcast communication from the second cell that includes second cell configuration information associated with receiving multicast communications from the second cell while operating in the inactive state, based at least in part on the multicast mobility information indicating that the second cell is included in the list of cells that supports multicast communications for UEs while operating in the inactive state; and
receive, while operating in the inactive state, the one or more multicast communications from the second cell based at least in part on the second cell configuration information.

22. A network node for wireless communication, comprising:
at least one memory; and
at least one processor communicatively coupled with the at least one memory, the at least one processor configured to cause the network node to:
receive, from a user equipment (UE), capability information indicating a capability of the UE to receive multicast communications while operating in an inactive state;
transmit, to the UE, configuration information that indicates a common frequency resource (CFR) associated with the UE receiving multicast communications from a cell associated with the network node while operating in the inactive state;
transmit, to the UE, multicast mobility information relating to the UE receiving multicast communications from one or more neighboring cells to the cell while operating in the inactive state,
wherein the multicast mobility information includes a list of cells, of the one or more neighboring cells, that support multicast for the UE while operating in the inactive state; and
transmit, to the UE while the UE is operating in the inactive state, one or more multicast communications in the CFR.

23. The network node of claim 22, wherein the CFR is a multicast CFR in a downlink dedicated bandwidth part (BWP), the multicast CFR being associated with the UE receiving multicast communications from the cell associated with the network node while operating in a connected state.

24. The network node of claim 22, wherein, to cause the network node to transmit the configuration information, the at least one processor is configured to cause the network node to:
transmit a unicast communication including the configuration information, wherein the CFR is a multicast CFR indicated by the configuration information, and wherein the configuration information indicates a configuration for a multicast multicast broadcast service (MBS) control channel (MCCH) message to be transmitted to the UE in the multicast CFR.

25. The network node of claim 22, wherein, to cause the network node to transmit the configuration information and the multicast mobility information, the at least one processor is configured to cause the network node to:
transmit a broadcast communication that includes the configuration information and the multicast mobility information.

26. The network node of claim 25, wherein the broadcast communication includes a system information block (SIB) or a multicast and broadcast service (MBS) control channel (MCCH) message, wherein the configuration information is included in a multicast configuration indicated in the SIB or the MCCH message.

27. The network node of claim 26, wherein the configuration information is included in a same SIB or MCCH message as broadcast configuration information relating to receiving broadcast communications in the inactive state, and wherein the CFR is a shared CFR for receiving broadcast communications and multicast communications from the cell associated with the network node while operating in the inactive state.

28. A method of wireless communication performed by a user equipment (UE), comprising:
transmitting capability information indicating a capability of the UE to receive multicast communications while operating in an inactive state;
receiving, from a first cell, configuration information that indicates a common frequency resource (CFR) associated with receiving multicast communications from the first cell while operating in the inactive state;
receiving, from the first cell, multicast mobility information associated with receiving multicast communications from one or more neighboring cells while operating in the inactive state,
wherein the multicast mobility information includes a list of cells, of the one or more neighboring cells, that support multicast for the UE while operating in the inactive state; and receiving, while operating in the inactive state, one or more multicast communications from a second cell of the one or more neighboring cells based at least in part on the multicast mobility information.

29. A method of wireless communication performed by a network node, comprising:
receiving, from a user equipment (UE), capability information indicating a capability of the UE to receive multicast communications while operating in an inactive state;
transmitting, to the UE, configuration information that indicates a common frequency resource (CFR) associated with the UE receiving multicast communications from a cell associated with the network node while operating in the inactive state;
transmitting, to the UE, multicast mobility information relating to the UE receiving multicast communications from one or more neighboring cells to the cell while operating in the inactive state,
wherein the multicast mobility information includes a list of cells, of the one or more neighboring cells, that support multicast for the UE while operating in the inactive state; and
transmitting, to the UE while the UE is operating in the inactive state, one or more multicast communications in the CFR.

30. The method of claim 28, further comprising:
receiving, while operating in the inactive state, at least one multicast communication from the first cell in the CFR based at least in part on the configuration information.

* * * * *